US010497033B2

(12) United States Patent
Sutton-Shearer

(10) Patent No.: US 10,497,033 B2
(45) Date of Patent: *Dec. 3, 2019

(54) VIRTUAL GOODS HAVING NESTED CONTENT AND SYSTEM AND METHOD FOR DISTRIBUTING THE SAME

(71) Applicant: Bimodal LLC, Wilmington, DE (US)

(72) Inventor: Drake Sutton-Shearer, Los Anges, CA (US)

(73) Assignee: Bimodal LLC, Wilmington, DE (US)

( * ) Notice: Subject to any disclaimer, the term of this patent is extended or adjusted under 35 U.S.C. 154(b) by 466 days.

This patent is subject to a terminal disclaimer.

(21) Appl. No.: 15/250,739

(22) Filed: Aug. 29, 2016

(65) Prior Publication Data

US 2017/0206567 A1    Jul. 20, 2017

Related U.S. Application Data

(63) Continuation of application No. 13/068,057, filed on May 2, 2011, now Pat. No. 9,430,791.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0277* (2013.01); *G06Q 30/0226* (2013.01); *G06Q 30/0239* (2013.01); *G06Q 30/0619* (2013.01)

(58) Field of Classification Search
CPC .............. G06Q 30/02; G06Q 30/0226; G06Q 30/0239; G06Q 30/0277; G06Q 30/0619
See application file for complete search history.

(56) References Cited

U.S. PATENT DOCUMENTS

| | | | | |
|---|---|---|---|---|
| 6,411,960 | B1 * | 6/2002 | Fisher | G06F 17/211 |
| 7,580,861 | B1 * | 8/2009 | Song | G06Q 30/0253 |
| | | | | 705/14.51 |
| 8,219,454 | B2 * | 7/2012 | Karlsson | G06Q 30/0601 |
| | | | | 705/26.1 |
| 9,430,791 | B1 * | 8/2016 | Sutton-Shearer | |
| | | | | G06Q 30/0619 |
| 2006/0195362 | A1 * | 8/2006 | Jacobi | G06Q 30/02 |
| | | | | 705/343 |
| 2009/0222424 | A1 * | 9/2009 | Van | G06Q 30/02 |
| 2010/0049657 | A1 * | 2/2010 | Aichroth | G06Q 30/0214 |
| | | | | 705/59 |
| 2011/0078030 | A1 * | 3/2011 | Borst | G06Q 30/02 |
| | | | | 705/14.73 |

(Continued)

OTHER PUBLICATIONS

Koung-Lung Lin "A Recommender for Targeted Advertisement of Unsought Products in E-Commerce", Proceedings of the Seventh IEEE International Conference on E-Commerce Technology (CEC'05) 1530-1354/05 $20.00 © 2005 IEEE. (Year: 2005).*

*Primary Examiner* — Naeem U Haq
(74) *Attorney, Agent, or Firm* — Duncan Galloway Egan Greenwald, PLLC; Kevin T. Duncan

(57) ABSTRACT

Virtual goods having nested content are distributed. The virtual goods can be branded or not branded. The nested content can be virtual goods, digital media (music files, video files, pictures and/or other digital media), promotional content (e.g., coupons, incentives, advertisements and/or other promotional content) and/or other nested content. The nested content can include one or more units or combinations of units.

18 Claims, 9 Drawing Sheets

(56) References Cited

U.S. PATENT DOCUMENTS

| | | | |
|---|---|---|---|
| 2011/0276400 A1* | 11/2011 | Kurnit | G06Q 30/02 |
| | | | 705/14.55 |
| 2012/0101886 A1* | 4/2012 | Subramanian | G06Q 30/0222 |
| | | | 705/14.23 |
| 2012/0109785 A1* | 5/2012 | Karlsson | G06Q 30/0601 |
| | | | 705/27.1 |

* cited by examiner

VIRTUAL GOODS HAVING NESTED CONTENT AND SYSTEM AND METHOD FOR DISTRIBUTING THE SAME

CROSS-REFERENCE TO RELATED APPLICATION

This application is a continuation of U.S. patent application Ser. No. 13/068,057, entitled VIRTUAL GOODS HAVING NESTED CONTENT AND SYSTEM AND METHOD FOR DISTRIBUTING THE SAME, filed May 2, 2011, and issuing as U.S. Pat. No. 9,430,791, which is incorporated by reference herein in its entirety.

FIELD

This disclosure relates to virtual goods configured to disperse nested content to users.

BACKGROUND

Distribution of virtual goods to users within virtual environments is known. Generally, users acquire virtual goods for their value within the virtual environment. For example, virtual goods may be acquired for their rarity within the virtual environment, for their utility within the virtual environment, for their decorative value within the virtual environment, and/or for other purposes. Virtual goods may be expressed within a virtual environment such that an individual instance of a virtual good is perceptible to a plurality of users within the virtual environment. However, individual instances of virtual goods are typically associated by ownership and/or control with a corresponding, specific set of one or more users.

Virtual goods denoting a connection with real world entities are known. For example, virtual goods may depict or connote a connection with a real world sports team, a real world entertainer, a real world place, and/or other real world entities.

SUMMARY

One aspect of this disclosure relates to virtual goods having nested content. The virtual goods can be branded or not branded. The nested content can be virtual goods, digital media (music files, video files, pictures, and/or other digital media), promotional content (e.g., coupons, incentives, advertisements and/or other promotional content), augmented reality content, and/or other nested content. The nested content can include one or more units or combinations of units. For simplicity, in some instances below, the description will refer to one unit of nested content. It is to be understood that the invention is not so limited and that the same features can apply to multiple nested units of content.

In some implementations, nested content is transmitted and/or transmitted with an electronic file defining instances of a virtual good. In some cases, upon reception of an instance of the virtual good, the instance of the virtual good is accessible to the user, but one or more units of the nested content are not accessible (e.g., are locked or otherwise made inaccessible), unless and until there is satisfaction of predetermined criteria. According to another aspect of the invention, upon reception of an instance of the virtual good, and upon the satisfaction of predetermined criteria the user is given access to one or more units of the nested content (e.g., by use of a code to download the nested content).

Instances of the virtual good may be gifted, re-gifted, traded, and/or otherwise exchanged between the users. An instance of the virtual good may include an expression, an underlying file, and/or other components. The virtual good may be defined by criteria included in the underlying file.

The expression of an instance of the virtual good may include the visual content, audible content, and/or other sensory content by which the instance of the virtual good is manifested in a virtual environment. The expression may be presented to users via computing platforms used to access the virtual environment.

A virtual good may be available to the users across multiple virtual environments. This may result in expressions of a single instance of the virtual good being present within multiple virtual environments. For example, a user may receive one expression of a single instance of the virtual good on a social networking web site, another expression of the instance of the virtual good in a virtual space, and/or expression of the instance of the virtual good in a mobile or web application dedicated to the access and distribution of virtual goods, a web page dedicated to the access and distribution of virtual goods, and/or other expressions of the instance of the virtual good in other virtual environments. To accomplish this electronic files for the virtual good may be transmitted to the separate virtual environment appropriate for the user. In such implementations, actions taken by the user with respect to the instance in one of the multiple virtual environments (e.g., receiving the nested content, re-distributing the virtual good, and/or other actions) may be reflected in the expressions of the instance of the virtual good on some of all of the other virtual environments.

The underlying file associated with an instance of a virtual good may be a processor readable electronic file that is storable to a non-transitory electronic storage. The underlying file may be stored to an electronic storage associated with a computing platform used by a user to access the virtual environment, a server hosting the virtual environment, and/or other electronic storage. The underlying file may be a single file, or may include plurality of files transmitted and/or processed within computing platforms (e.g., servers, and/or clients) as a group (e.g., as a folder, archive, or compressed file). The underlying file may include define one or more aspects of the expression, may define nested content to be dispersed through the instance of the virtual good, and/or may include some or all of the nested content to be dispersed.

The criteria defining the instance of the virtual good may include one or more of distribution criteria, stage criteria, expression criteria, nested content criteria, content dispersal criteria, and/or other criteria. The criteria may be set by the distributor of virtual good, a sponsor of virtual good, a creator or supplier of nested content being distributed through a virtual good being created, an operator of the virtual environment, and/or other entities.

The distribution criteria may specify which users are to receive instances of virtual good in an initial distribution of the virtual good. The distribution criteria, for example, may specify users satisfying one or more of criteria associated with past behavior, criteria associated with a loyalty program, demographic criteria, and/or other criteria.

Demographic criteria may specify users having one or more demographic attributes. Whether users have the one or more demographic attributes may be determined from demographic information associated with the users. The demographic information may include one or more of sex, age, household income, marital status, race, education, location, and/or other demographic information.

The instance of the virtual good may have a plurality of stages. In different stages, the instance of the virtual good may have a different expression (e.g., how the instance of the virtual good is expressed visually, audibly, and/or otherwise expressed in the virtual environment may vary between stages), disperse different nested content, have a different dispersal requirement, and/or have other differences. The stage criteria may specify events that cause the instance of the virtual good to transition from one stage to another.

Events specified by stage criteria as causing the instance of the virtual good to transition from one stage to another may include events that trigger a change for a plurality of instances of the virtual good (e.g., all of the instances of the virtual good) and/or events that trigger a change for an individual instance of the virtual good. Events that may trigger a change for an individual instance of virtual good to may include dispersal of nested content to a user, re-distribution of an instance of the virtual good from one user to one or more other users, and/or other events. Events that may trigger a change for a plurality of instances of the virtual good may include expiration of an offer, and/or other events. Expiration of an offer may occur responsive to one or more events specified by stage criteria. Such events may include, for example, a threshold number of dispersals of a unit of nested content, a threshold number of offers for a unit of nested content provided within instance of the virtual good, a threshold amount of time an instance of virtual good has been possessed by a user (e.g., from distribution and/or re-distribution of the instance of the virtual good), and/or other events.

Nested content criteria may specify units of nested content available to users via the instance of the virtual good. In some implementations, nested content criteria associated with the instance of the virtual good may specify different units of nested content for different stages of the instance of the virtual good. As such, nested content criteria may specify a first unit of nested content for a first set of one or more stages, a second unit of nested content for a second set of one or more stages, and/or other units of nested content for other stages. For example, the first unit of nested content may be unit of nested content provided to users at distribution, with the second unit of content being presented or offered to users subsequent to acceptance and/or receipt of the first unit of nested content.

Nested content criteria may specify units of nested content such that units of nested content distributed through one or more stages of the virtual good are dynamic between different users. In such implementations, the nested content criteria may specify parameters for determining which unit of content should be distributed to a given user. For example, nested content criteria for the second unit of content discussed above may be determined for the given user based on previous activity by the given user, preferences set by the given user, ratings of previous units of nested content by the given user, demographic information of the given user, and/or other parameters specific to the given user. Previous activity by the given user may include units of nested content received (e.g., for free or via purchase) via other virtual goods, and/or other activities by the given user.

The nested content criteria may be determined to disperse a given unit of nested content (e.g., a song, a video trailer, an image, augmented reality content, and/or other units of content) intermittently. This may involve not dispersing the given unit of nested content through every virtual good. For example, the given unit of nested content may be dispersed according to a specific dispersal rate (e.g., 1 unit of content per X number of distributions, 1 unit of content per attempts to obtain the nested content, and/or other rates). To accomplish this, the given unit of nested content may be dispersed every xth distribution (or attempt to obtain the nested content), dispersed randomly so the overall rate over a large number of distributions (or attempts) meets the specific dispersal rate, and/or through other distribution techniques. Intermittent dispersals (e.g., randomly, periodically, and/or other intermittent dispersal) may result in heightened anticipation and/or participation by users. For dispersals in which the given unit of nested content is not dispersals, a secondary unit of nested content may be dispersed instead. The secondary unit of nested content may be of less value (real or perceived) than the given unit of nested content.

The content dispersal criteria may specify activity by users that will result in dispersal of nested content by the instance of the virtual good. As such, content dispersal criteria may specify one or more of an interactivity threshold, a purchase price, and/or other criteria specifying activity by users that will result in distribution of nested content.

An interactivity threshold may include a threshold of interaction with the instance of the virtual good required before nested content (e.g., one or more units of nested content) associated with the virtual good is dispersed to a given user. The interactivity threshold may require interaction by the given user and/or other users. For example, the interactivity threshold may require a level of interaction by a specified number of users to whom the given user has re-distributed virtual good. The interactivity threshold may require passive and/or active interaction with the instance of the virtual good.

The virtual good may be configured such that the nested content dispersed to users is provided to a user through the expression of the instance of the virtual good.

As such, a representation of an electronic file storing nested content may be presented to a user in a view of the virtual environment as if the expression were bestowing the nested content to the user. The electronic file storing the nested content may then be stored to an electronic storage medium (e.g., of a client computing device) for use by the user.

Individual virtual goods may include one or more identifiers. The one or more identifiers may include one or more of an identifier for an expression, an identifier for the nested content included with the virtual good, an identifier for the virtual good itself, an identifier for the combination of the expression and nested content, and/or other identifiers. The identifiers may be leveraged for tracking the virtual goods and/or user interactions therewith. Tracking information obtained from this tracking may be leveraged to generate alerts to users informing them of tracked events (e.g., dispersals, distributions, etc.). Tracking information obtained from tracking the virtual goods and/or user interactions may be implemented to determine analytics and/or metrics about the interactions of users with the virtual goods. The analytics and/or metrics may provide insight with respect to specific sets of virtual goods and/or specific sets of users.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

In one embodiment the present invention provides a non-transitory, electronic storage medium storing a virtual good that is expressed in one or more virtual environments, the information stored on the electronic storage medium comprising: an expression that is displayed on electronic displays of client computing platforms of users receiving views of the one or more virtual environments to represent an instance of the virtual good; nested content offered to users through the expression; dispersal criteria defining activity required by one or more users that will result in the nested content being dispersed to a first user associated with the instance of the virtual good; and a unique identifier identifying one or more of the expression, the nested content, or the dispersal criteria.

The embodiment may further comprise wherein satisfaction of the dispersal criteria will result in the nested content being dispersed to the first user. The unique identifier may be configured to facilitate determination of a metric expressing an amount, rate, or proportion at which a specific event occurred with respect to virtual goods having a common expression with the virtual good. The unique identifier may be configured to facilitate determination of a metric expressing an amount, rate, or proportion at which a specific event occurred with respect to virtual goods having nested content in common with the virtual good. The unique identifier may be configured to facilitate determination of a metric expressing an amount, rate, or proportion at which a specific event occurred with respect to the virtual good distributed to users having a common characteristic. The common characteristic may be one or more of a demographic characteristic, a system usage characteristic, or a relationship in the one or more virtual environments with a common user. The common characteristic may be a demographic characteristic, and wherein the demographic characteristic comprises one or more of age, gender, marital status, education level, or geographic location. The one or more virtual environments may comprise a plurality of virtual environments. The plurality of virtual environments may comprise two or more of a social networking website, a micro-blogging service, a dedicated mobile application, or a virtual space. An event may occur within a given one of the plurality of virtual environments that impacts the expression of the virtual good in the given virtual environment also impacts the expression of the virtual good in at least one of the other ones of the virtual environments.

In another embodiment, the present invention provides a system configured to provide virtual goods to users within one or more virtual environments, the system comprising: one or more servers configured to execute computer program modules, the computer program modules comprising: a goods creation module configured to create virtual goods, wherein creation of a virtual good comprises determining criteria defining the virtual good, the criteria comprising: expression criteria defining an expression that is displayed on electronic displays of client computing platforms of users receiving views of the one or more virtual environments to represent an instance of the virtual good; nested content criteria defining nested content offered to users through the expression; and dispersal criteria defining activity required by one or more users that will result in the nested content being dispersed to a first user associated with the instance of the virtual good; and a goods distribution module configured to distribute virtual goods to users of the one or more virtual environments.

The system of the above embodiment may further comprise the goods creation module is further configured to associate different unique identifiers with individual ones of the virtual goods, wherein the unique identifiers identify one or more of the expression, the nested content, or the dispersal criteria associated with the individual virtual goods. The computer program modules may further comprise an analytics module configured to determine, based on the unique identifiers, a metric expressing an amount, rate, or proportion at which a specific event occurred with respect to virtual goods having common nested content. The computer program modules may further comprise an analytics module configured to determine, based on the unique identifiers, a metric expressing an amount, rate, or proportion at which a specific event occurred with respect to virtual goods distributed to users having a common characteristic. The common characteristic may be one or more of a demographic characteristic, a system usage characteristic, or a relationship in the one or more virtual environments with a common user. The common characteristic may be a demographic characteristic, and wherein the demographic characteristic comprises one or more of age, gender, marital status, education level, or geographic location. The one or more virtual environments may comprise a plurality of virtual environments. The plurality of virtual environments may comprise two or more of a social networking website, a micro-blogging service, a dedicated mobile application, or a virtual space. An event may occur within a given one of the plurality of virtual environments that impacts the expression of the virtual good in the given virtual environment also impacts the expression of the virtual good in at least one of the other ones of the virtual environments.

DETAILED DESCRIPTION

Figure 1:
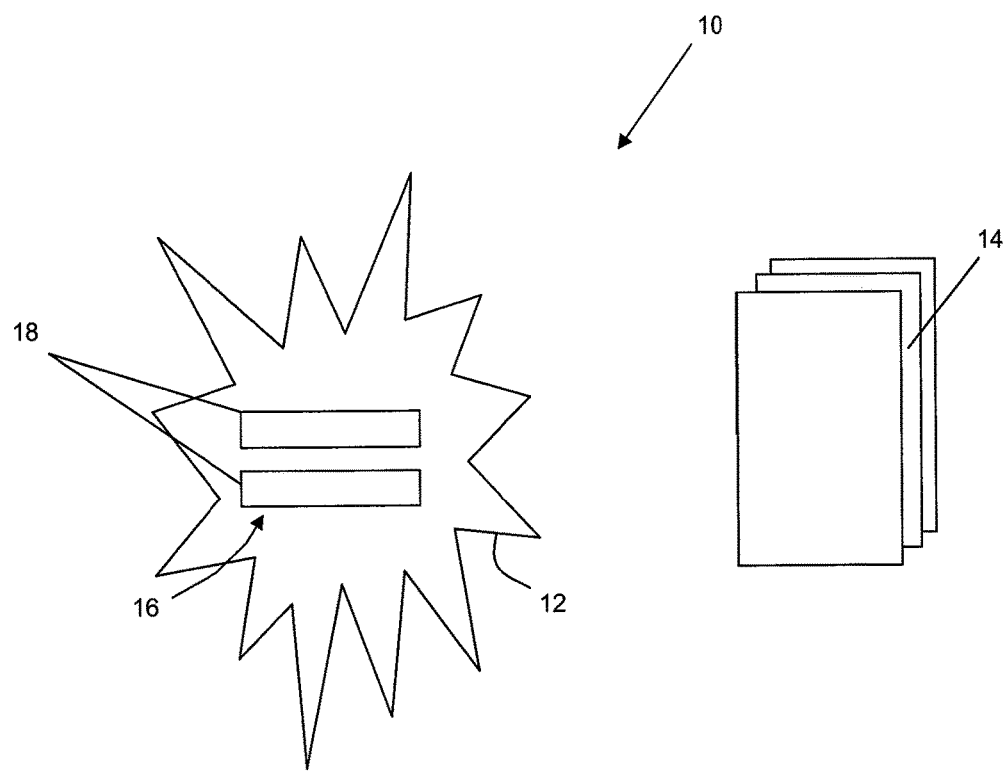
FIG. 1 illustrates an instance of a virtual good having nested content therein.

FIG. 1 illustrates an instance of a virtual good 10 having nested content. For example, the nested content may include audio (e.g., songs, albums, audio books, and/or other audio content), video (e.g., television shows, movies, and/or other video content), incentives to purchase real world goods and/or services, augmented reality content, and/or other content, information, or items. The nested content may be dispersed to users via virtual good 10. The may include users being dispersed a unit of nested content (e.g., a song, a show, a trailer, an image, an incentive, and/or other units of content) directly from virtual good 10 without having to invoke a separate application (e.g., a web browser) and visit a web site dedicated to dispersing content (e.g., via a hyperlink). For simplicity, in some instances below, the description will refer to one item of nested content. It is to be understood that the invention is not so limited and that the same features can apply to multiple nested items.

The virtual good 10 may disperse nested content to users for free and/or based on purchase. Dispersal of nested content may include unlocking nested content to a user that was previously locked. The locked nested content dispersed to users for free may require a threshold level of interaction with the virtual good 10 to unlock the nested content. The virtual good 10 may be gifted, re-gifted, traded, and/or otherwise exchanged between the users. The virtual good 10 may provide for limitations on dispersal of nested content. The virtual good 10 may provide a mechanism for offering nested content to targeted sets of users for sale and/or for free. The instance of virtual good 10 may include an expression 12, an underlying file 14, and/or other components. The virtual good 10 may be defined by criteria.

The virtual good 10 may be a non-physical object that can be purchased for use, display, and/or possession in online communities, online games, virtual worlds, other virtual spaces, social networks, other interactive electronic social media, and/or other virtual environments. The virtual good 10 may include, for example, such things as a digital gift, digital clothing for an avatar, virtual real estate, a digital badge, an avatar, and/or any other virtual item. Sales of virtual good 10 may be referred to as micro transactions. Virtual good 10 may be distinguishable from other forms of digital media such as, for example, digital downloads of music, podcasts, films, television shows, pictures, and/or other digital media. For example, an instance of virtual good 10 may be perceived by a plurality of users within the virtual environment in which exists, but may be associated with (e.g., owned, controlled, or otherwise associated with) an individual user. As such, the instance of virtual good 10 may be passed between users, and a user may perceive virtual good 10 in the virtual environment without being able to receive some or all of the benefits of virtual good 10. For example, users generally may be able to see and/or hear expression 12 of an instance of virtual good 10 without being able to receive dispersal(s) of nested content from virtual good 10. Only the user associated with the instance of virtual good 10 may be able to receive the dispersal(s) of nested content. Virtual good 10 may differ from other forms of digital media in that the instance of virtual good 10 may exist in its virtual environment independent from whether one or more users are currently perceiving the instance of virtual good 10.

An "instance" of virtual good 10 may refer to an individual occurrence of virtual good 10. The individual instance of virtual good 10 may be perceptible to a plurality of users within its virtual environment, but the individual instance is expressed in the virtual environment as an individual virtual object. A plurality of instances of virtual good 10 may exist within an individual virtual environment, but each instance is expressed to users in the virtual environment as a virtual object that is separate from the other instances. For example, a first user may be associated with a first instance of virtual good 10, and a second user may be associated with a second instance of virtual good 10.

The expression 12 of an instance of virtual good 10 may include the visual content, audible content, and/or other sensory content by which the virtual good 10 is manifested in a virtual environment. The expression 12 may be presented to users via computing platforms used to access the virtual environment. The expression 12 may include an interface 16. Via the interface 16, users may interact with virtual good 10. The interface 16 may include one or more fields 18 configured to present and/or receiving information from the users. The fields 18 may include one or more selectable controls (e.g., buttons, knobs, menu boxes, menus, and/or other selectable controls), display fields, information entry fields, and/or other interface fields. The interface 16 may be presented as a graphical user interface (and/or as a portion thereof) displayed to users on an electronic display of a computing platform used to access the virtual environment.

The underlying file 14 may be a processor readable electronic file that is storable to a non-transitory electronic storage. The underlying file 14 may be stored to an electronic storage associated with a computing platform used by a user to access the virtual environment, a server hosting the virtual environment, and/or other electronic storage. The underlying file 14 may be a single file, or may include plurality of files transmitted and/or processed within computing platforms (e.g., servers, and/or clients) as a group (e.g., as a folder, archive, or compressed file). The underlying file 14 may include define one or more aspects of expression 12, may include a location (e.g., a network location, such as a URL) from which information defining one or more aspects of expression 12 may be obtained or received, and/or other information used to define expression 12. The underlying file 14 may define units of nested content (e.g., a unit of content, a unit of information, and/or an item) of virtual good 10 to be dispersed through the instance of virtual good 10. The underlying file 14 of an instance of virtual good 10 may include some or all of the nested content to be dispersed such that the nested content is transmitted or processed along with the electronic file(s) defining expression 12 of the instance of virtual good 10. The underlying file 14 of the instance of virtual good 10 may include a location (e.g., a network location, such as a URL) from which the nested content can be obtained or received by the virtual good 10 for dispersal. The underlying file 14 may include some or all of the criteria defining the virtual good 10, and/or may include a location (e.g., a network location, such as a URL) from which some or all of the criteria defining virtual good 10 can be obtained or received.

The underlying file 14 may include an identifier for expression 12, an identifier for the nested content included with virtual good 10, an identifier for virtual good 10, an identifier for the combination of expression 12 and nested content, and/or other identifiers. An identifier for expression 12 may identify expression 12 individually, as a member of a set of expressions, and/or otherwise identify expression 12. An identifier for the nested content may identify a unit of content individually, may identify a unit of content as a set of units, and/or otherwise identify a unit of content. An identifier for virtual good 10 may identify virtual good 10 individually, may identify virtual good 10 as a member of a set of virtual goods, and/or may otherwise identify virtual good 10.

The criteria defining virtual good 10 may include one or more of distribution criteria, stage criteria, expression criteria, nested content criteria, content dispersal criteria, and/or other criteria. The criteria may be set by the distributor of virtual good 10, a sponsor of virtual good 10, a creator or supplier of nested content being distributed through a virtual good being created, an operator of the virtual environment, and/or other entities.

The distribution criteria may specify which users are to receive instances of virtual good 10 in an initial distribution of virtual good 10. The distribution criteria, for example, may specify users satisfying one or more of criteria associated with past behavior, criteria associated with a loyalty program, demographic criteria, and/or other criteria.

Criteria associated with past behavior may specify requisite behavior by users in the past in re-distributing received virtual goods. For example, distribution criteria may specify users having a history of consistently re-distributing received virtual goods to other users, users having a history of re-distributing received virtual goods to a relatively large number of users, and/or other users having a history of re-distributing received virtual goods.

Criteria associated with a past behavior may specify users having a history of consistently accepting offers of nested content in the virtual goods. Such users may have demonstrated willingness to take actions required in order to receive the nested content associated with virtual goods they have received in the past. Some of the potential requirements associated with receiving nested associated with virtual goods are discussed herein.

Criteria associated with a loyalty program may specify users involved in a loyalty program associated with the creator, distributor, and/or supplier of nested content (referred to as the "provider" of nested content). Users involved in a loyalty program may include users that have previously provided contact information to the provider of nested content (e.g., an identity within a virtual environment, an email address, a phone number, and/or other contact information), users that have performed activities encouraged by a loyalty program associated with the provider of nested content, and/or users involved in other ways with the loyalty program associated with the provider of nested content. Criteria associated with the loyalty program of the provider of nested content may specify users having some threshold level of status (e.g., a threshold level of points, badges, and/or other indicia of loyalty) within the loyalty program. Criteria associated with a loyalty program may specify users involved in a loyalty program associated with a sponsor of virtual good 10 and/or one of its units of nested content. Users involved in a loyalty program may include users that have previously provided contact information to the sponsor of nested content or virtual good 10 (e.g., an identity within a virtual environment, an email address, a phone number, and/or other contact information), users that have performed activities encouraged by a loyalty program associated with the sponsor of nested content or virtual good 10, and/or users involved in other ways with the loyalty program associated with the sponsor of nested content or virtual good 10. Criteria associated with the loyalty program of the sponsor of nested content or virtual good 10 may specify users having some threshold level of status (e.g., a threshold level of points, badges, and/or other indicia of loyalty) within the loyalty program. Criteria associated with a loyalty program may specify users involved in a loyalty program associated with the distributor of virtual good 10, and/or the operator of the virtual environment. As is discussed herein, users involved in the loyalty program associated with the distributor of virtual good 10 may receive points (or other virtual currency or recognition) for performing incentivized activities with respect to the virtual good 10. Criteria associated with the loyalty program of the distributor of virtual good 10 may specify users having some threshold level of status (e.g., a threshold level of points, badges, and/or other indicia of loyalty) within the loyalty program. Demographic criteria may specify users having one or more demographic attributes. Whether users have the one or more demographic attributes may be determined from demographic information associated with the users. The demographic information may include one or more of sex, age, household income, marital status, race, education, location, and/or other demographic information.

The virtual good 10 may have a plurality of stages. In different stages, instances of virtual good 10 may have a different expression 12 (e.g., how the instance of virtual good 10 is expressed visually, audibly, and/or otherwise expressed in the virtual environment may vary between stages), different nested content, a different dispersal requirement, and/or other differences. The stage criteria may specify events that cause an instance of the virtual good 10 to transition from one stage to another. Transition by the instance of virtual good 10 from one stage to another stage may cause a modification to instance of virtual good 10, may cause activate and/or deactivate information stored in underlying file 14 defining the instance of virtual good 10, and/or changes to the instance of virtual good 10 accomplished by other mechanisms. The change(s) to the instance of virtual good 10 may result in a change to one or more of expression 12, nested content, a dispersal requirement, a source or location of nested content (e.g., after an expiration, dispersal of nested content may continue but with a call to action to visit an external site associated with a sponsor), and/or other aspects of the instance of virtual good 12.

Events specified by stage criteria as causing the instance of the virtual good 10 to transition from one stage to another may include events that trigger a change for a plurality of instances of virtual good 10 (e.g., all of the instances of virtual good 10) and/or events that trigger a change for an individual instance of virtual good 10. Events that may trigger a change for an individual instance of virtual good to may include dispersal of nested content to a user, re-distribution of an instance of virtual good 10 from one user to one or more other users, and/or other events. Events that may trigger a change for a plurality of instances of virtual good 10 may include expiration of an offer, and/or other events. Expiration of an offer may occur responsive to one or more events specified by stage criteria. Such events may include, for example, a threshold number of dispersals of a unit of nested content, a threshold number of offers for a unit of nested content provided within instance of virtual good 10, a threshold amount of time an instance of virtual good has been possess by a user (e.g., from distribution and/or re-distribution of the instance of virtual good 10), and/or other events.

Determination that a threshold amount of offers of dispersal of a unit of nested content, dispersals of a unit of nested content, and/or other threshold amounts may be based on a single instance of virtual good 10, on all instances of virtual good 10 distributed, and/or based on other groups of virtual good 10. A single instance may refer to an instance of virtual good 10 possessed by an individual user. For example, a first user may redistribute a single instance of virtual good 10 to a second user, who may redistribute the single instance of virtual good 10 to a third user, and so on. By contrast, the distributor of virtual good 10 may distribute separate instances of virtual good 10 to different users in a single initial distribution.

Expression criteria may specify one or more aspects of expression 12 of instances of virtual good 10. If virtual good 10 has multiple stages, the expression criteria may include expression criteria particular to one or more stages of virtual good 10, and/or expression criteria that applies to all stages of virtual good 10. Expression criteria may include the actual content used to manifest virtual good 10 within its virtual environment(s), and/or may include references to locations (e.g., URLs) at which the appropriate content can be accessed.

Nested content criteria may specify units of nested content available to users via instances of virtual good 10. In some implementations, nested content criteria associated with an instance of virtual good 10 may specify different units of nested content for different stages of the instance of virtual good 10. As such, nested content criteria may specify a first unit of nested content for a first set of one or more stages, a second unit of nested content for a second set of one or more stages, and/or other units of nested content for other stages. For example, the first unit of nested content may be the unit of nested content provided to users at distribution, with the second unit of content being presented or offered to users subsequent to acceptance and/or receipt of the first unit of nested content.

Nested content criteria may specify units of nested content such that units of nested content dispersed through one or more stages of virtual good 10 are dynamic between different users. In such implementations, the nested content criteria may specify par meters for determining which unit of content should be dispersed to a given user. For example, nested content criteria for the first and/or the second unit of content discussed above may be determined for the given user based on previous activity by the given user, preferences set by the given user, ratings of previous units of nested content by the given user, demographic information of the given user, and/or other parameters specific to the given user. The nested content criteria may specify that the determination of whether to distribute the first and/or the second unit of content is random. The nested content criteria may be determined to disperse a given unit of nested content (e.g., a song, a video trailer, an image, and/or other units of content) according to a specific dispersal rate (e.g., 1 unit of content per X number of distributions). To accomplish this, the given unit of nested content may be dispersed every xth distribution, dispersed randomly so the overall rate over a large number of distributions meets the specific dispersal rate, and/or through other distribution techniques. Intermittent dispersal (e.g., randomly, periodically, and/or other intermittent distributions) may result in heightened anticipation and/or participation by users. For dispersals in which the given unit of nested content is not dispersed, a secondary unit of nested content may be dispersed instead. The secondary unit of nested content may be of less value (real or perceived) than the given unit of nested content. The expression criteria for the virtual good may dictate that the expression at and/or after dispersal of nested content is different for the different units of content. For example, if the first unit of nested content is dispersed to a user, the expression of the virtual good may include a first animation at or after the time the nested content is dispersed. If the second unit of nested content is dispersed to the user, the expression of the virtual good may include a second animation at or after the time the nested content is dispersed.

Previous activity by the given user may include units of nested content received (e.g., for free or via purchase) via other virtual goods, and/or other activities by the given user. The nested content criteria for virtual good 10 may specify what user parameter should be used to determine the second unit of nested content, how user parameters should be used to determine the second unit of nested content, and/or other aspects of the second unit of nested content. The dynamic determination of units of nested content such as the second unit of nested content may enhance the number of users that receive the dynamic nested content (e.g., may enhance the number of units of nested content purchased).

The nested content distributed through virtual good 10 may include proprietary audio content such as, for example, songs, music albums, audio books, archived audio shows, and/or other audio content. The nested content may include video content such as, for example, movies, television shows, web shows, movie trailers, and/or other video content. The nested content may include image content such as, for example, high resolution posters or pictures, sequenced still images, and/or other image content. Nested content may include augmented reality content such as, for example, augmented reality information associated with a specified marker for image-based augmented reality, augmented reality information associated for a specific geolocation for location-based augmented reality. Nested content may be contained within a content file included with instances of virtual good 10, by reference to a location as which a content file can be accessed by virtual good 10 for dispersal to users, and/or by other mechanisms. Dispersal of nested content through virtual good 10 may include providing copies of electronic files with the content to users for download, provision of streaming content, and/or other dispersals of content.

Nested content specified by nested content criteria as being available to users via instances of virtual good 10 may include offers of and/or incentives to purchase real world goods and/or services. Such nested content may be referred to collectively as real world offer content. Real world offer content may be provided within virtual good 10 as a code that can be presented to a seller of the good and/or service being offered, an electronic file of a printable image that can be printed and presented to a seller of the good and/or service being offered, and/or real world offer content may be provided to users within instances of virtual good 10 in other ways.

The content dispersal criteria may specify activity by users that will result in dispersal of nested content by instances of virtual good 10. As such, content dispersal criteria may specify one or more of an interactivity threshold, a purchase price, and/or other criteria specifying activity by users that will result in distribution of nested content.

An interactivity threshold may include a threshold of interaction with an instance of virtual good 10 required before nested content (e.g., one or more units of nested content) associated with virtual good 10 is dispersed to a given user. The interactivity threshold may require interaction by the given user and/or other users. For example, the interactivity threshold may require a level of interaction by a specified number of users to whom the given user has re-distributed virtual good 10 (e.g., for 3 users that received instances of virtual good 10 from the given user, for 3 user that received the instance of virtual good 10 passed along by the given user from one user to the next, and/or other "downstream" groups of users). The interactivity threshold may require passive and/or active interaction with instances of virtual good 10. Passive interaction may include passively experiencing content associated with virtual good 10 (e.g., watching or listening to an advertisement associated with virtual good 10). Active interaction may include entering input. For example, active interaction may include playing a game, answering a question, and/or other entering other input. The active interaction may be accomplished via interface 16. The interactivity threshold for active interaction may require an outcome of the interaction. For example, the interactivity threshold may require successfully playing a game (e.g., winning the game or obtaining some objective within the game), correctly answering a question or questions, and/or requiring other outcomes. The interactivity threshold may require re-distribution of an instance of virtual good 10.

The purchase price of nested content may set a value that must be exchanged by a user to receive the nested content. The dispersal criteria may establish a purchase price as an alternative to performing the interaction required by an interactivity threshold. The purchase price of a unit of nested content may set the value in real world currency, a virtual currency, and/or other currencies. A virtual currency may include a currency that is obtained by purchase with real world currency, a currency that is obtained through gameplay, a currency that is obtained through loyalty and/or participation, and/or other currencies.

The virtual good 10 may be configured such that the nested content dispersed to users is provided to users through expression 12 of instances of the virtual good 10. As such, a representation of an electronic file (e.g., included with electronic file 14, received from an external source, and/or otherwise obtained by virtual good 10 for dispersal to the user) storing nested content may be presented to a user in a view of the virtual environment as if expression 12 were bestowing the nested content to the user. The electronic file storing the nested content may then be stored to an electronic storage medium (e.g., of a client computing device) for use by the user. In some implementations, nested content is dispersed to users through expression 12 by streaming content such that the content is presented through expression 12 in the virtual environment. Providing the nested content through expression 12 may enable the nested content to be provided to the user without invoking an external application or a separate instance of an application (e.g., a web browser) to access the nested content from outside of the virtual environment (e.g., at a separate web site). Providing the nested content through expression 12 may enable the nested content to be provided to the user without requiring the user to interact with an interface outside of the virtual environment.

Figure 2:
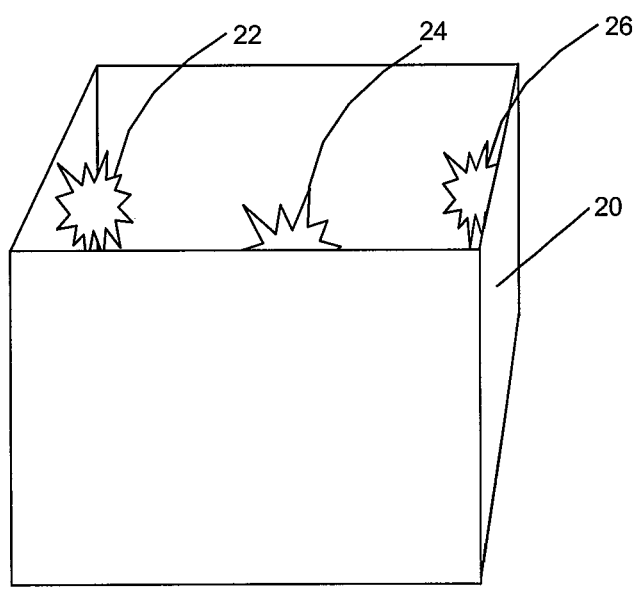
FIG. 2 illustrates a container having therein a plurality of virtual goods for delivery to a user.

FIG. 2 illustrates a container 20 that includes a set of one or more instances of virtual goods. The instances of virtual goods illustrated in FIG. 2 include an instance of a first virtual good 22, an instance of a second virtual good 24, and an nth virtual good 26. It will be appreciated that the set of instances of virtual goods could include more or less than the amount shown. The container 20 may be a delivery mechanism within a virtual environment used to distribute instances of virtual goods 22, 24, and/or 26. The container 20 may be locked such that a user receiving container 20 is not able to access the instances of virtual goods 22, 24, and/or 26 until the container 20 is unlocked. The container 20 may be time-locked, may require entry of an access code or identification information, and/or may require other parameter to be met before unlocking. One or more of virtual goods 22, 24, and/or 26 may be the same as or similar to virtual good 10 (shown in FIG. 1 and described herein).

Figure 3:
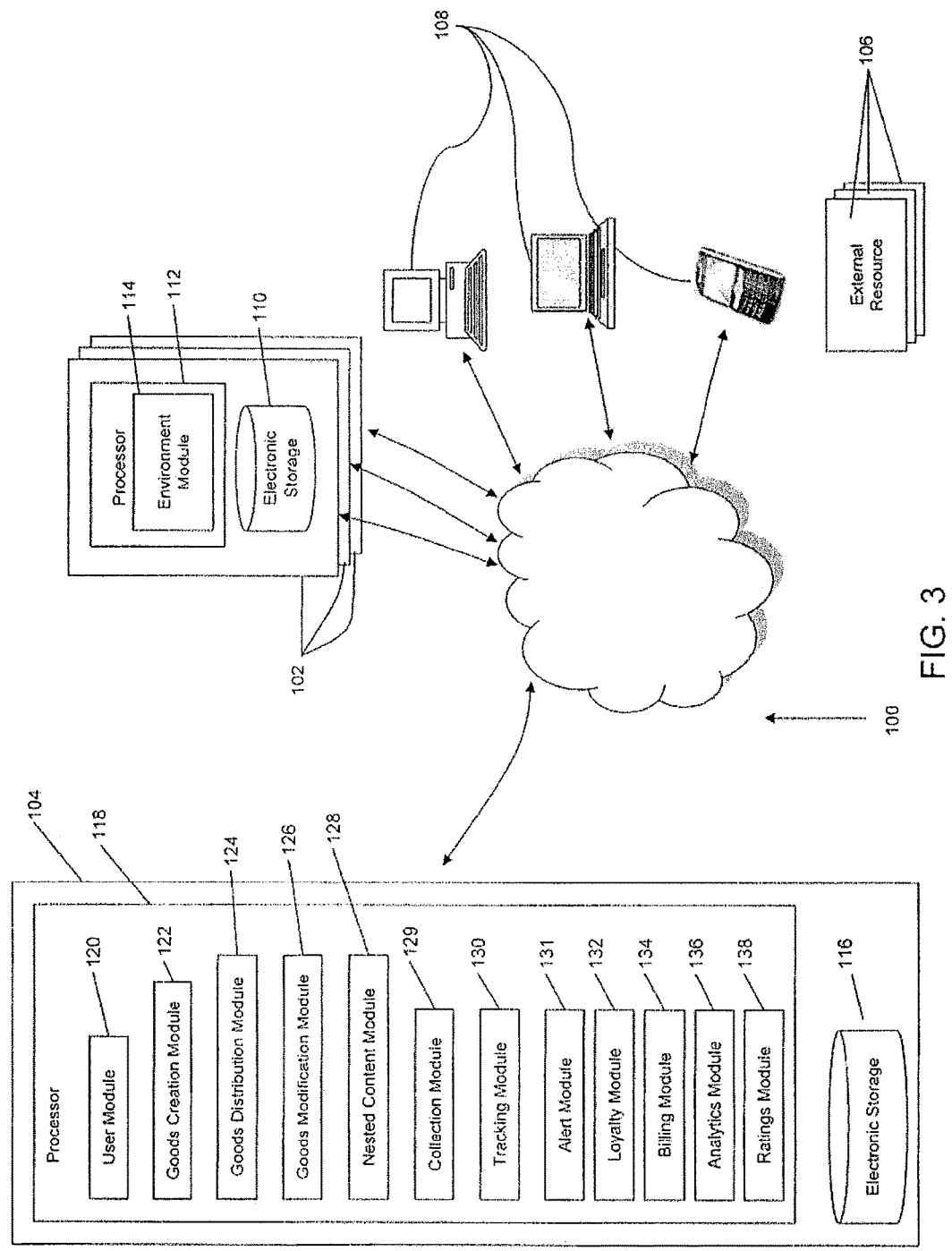
FIG. 3 illustrates a system configured to distribute virtual goods having nested content to users of one or more virtual environments.

FIG. 3 illustrates a system 100 configured to provide instances of virtual goods to users within one or more virtual environments, according to one or more implementations of the invention. The virtual goods may similar to or the same as virtual good 10 (shown in FIG. 1 and described herein).

In some implementations, system 100 may include one or more of one or more virtual environment servers 102, one or more system servers 104, and/or other components. The system 100 may operate in communication and/or coordination with one or more external resources 106. Users may interface with system 100 and/or external resources 106 via client computing platforms 108. The components of system 100, virtual environment servers 102, system servers 104, external resources 106, and/or client computing platforms 108 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which virtual environment servers 102, system servers 104, external resources 106, and/or client computing platforms 108 are operatively linked via some other communication media.

A given client computing platform 108 may include one or more processors configured to execute computer program modules. The computer program modules may be configured to enable one or more users associated with the given client computing platform 108 to interface with system 100 and/or external resources 106, and/or provide other functionality attributed herein to client computing platforms 108. By way of non-limiting example, the given client computing platform 108 may include one or more of a desktop computer, a laptop computer, a handheld computer, a NetBook, a Smartphone, a holographic device, and/or other computing platforms. In order to communicate with virtual environment servers 102 and/or system servers 104, client computing platform 108 may execute computer program modules associated with a client application. The client application may be a versatile, multi-purpose application, such as a web browser, a more specialized client application, such as a smartphone "app", and/or other client applications.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The virtual environment servers 102 may comprise electronic storage 110, one or more processors 112, and/or other components. The virtual environment servers 102 may include communication lines, or ports to enable the exchange of information with a network and/or other computing platforms. The processors 112 may be configured to execute computer program modules. The processors 112 may be configured to execute the computer program modules via one or more of hardware, software, and/or firmware. The computer program modules may include an environment module. 114, and/or other computer program modules. Although system 100 may be described in certain sections herein as including virtual environment servers 102, this is not intended to be limiting. The virtual environment servers 102 may be separate and distinct from system 100, and may be provided by an entity that is separate from, for example, the entity providing system servers 104. The environment module 114 may be configured to provide one or more virtual environments to users via client computing platforms 108. As used herein, a "virtual environment" may include a virtual space, one or more interactive, electronic social media, and/or other virtual environments.

A virtual space may comprise a simulated space (e.g., a physical space) instanced on a server (e.g., virtual environment servers 102) that is accessible by a client (e.g., client computing platforms 108) located remotely from the server to determine a view of the virtual space for display to a user. The simulated space may have a topography, express ongoing real-time interaction by the user, and/or include one or more objects positioned within the topography that are capable of locomotion within the topography. In some instances, the topography may be a 2-dimensional topography. In other instances, the topography may be a 3-dimensional topography. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.).

Within a virtual space provided by virtual environment servers 102, avatars associated with the users may be controlled by the users to interact with each other. As used herein, the term "avatar" may refer to an object (or group of objects) present in the virtual space that represents an individual user. The avatar may be controlled by the user with which it is associated. The avatars may interact with each other by physical interaction within the instanced virtual space, through text chat, through voice chat, and/or through other interactions. The avatar associated with a given user may be created and/or customized by the given user. The avatar may be associated with an "inventory" of virtual goods and/or currency that the user can use (e.g., by manipulation of the avatar and/or the items) within the virtual space. Interactive, electronic social media may include one or more of a social network, a virtual space. a micro-blogging service, a blog service (or host). a browser-based game, a multi-player mobile game, a file (e.g., image file, video file, and/or other files) sharing service, a messaging service, a message board, a forum and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by Secondlife®, the massively multi-player online game provided by World of Warcraft®, the file sharing service provided by Flickr®, Blogger, YouTube, PlayStation® Home, Xbox® Live, and/ or other interactive electronic social media.

The system servers 104 may include electronic storage 116, one or more processors 118, and/or other components. The system servers 104 may include communication lines, or ports to enable the exchange of information with a network and/or other computing platforms. It will be appreciated that the illustration of virtual environment servers 102 and system servers 104 as two separate sets of devices is not intended to be limiting. In some implementations, virtual environment servers 102 and system servers 104 may include at least one device in common that performs some or all of the functionality attributed herein to virtual environment servers 102 and some or all of the functionality attributed herein to system servers 104. Electronic storage 116 may comprise electronic storage media that electronically stores information. The electronic storage media of electronic storage 116 may include one or both of system storage that is provided integrally (i.e., substantially non-removable) with system servers 104 and/or removable storage that is removably connectable to system servers 104 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include storage provided virtually by a cloud, by a virtual private network, and/or by other virtual storage resources. Electronic storage 116 may store software algorithms, information determined by processor 118, information received from system servers 104, information received from client computing platforms 108, information received from virtual environment servers 102, and/or other information that enables system servers 104 to function properly. Processor(s) 118 is configured to provide information processing capabilities in system servers 104. As such, processor 118 may include one or more of a digital processor, an analog processor, a digital circuit designed to process information, an analog circuit designed to process information, a state machine, and/or other mechanisms for electronically processing information. Although processor 118 is shown in FIG. 3 as a single entity, this is for illustrative purposes only. In some implementations, processor 118 may include a plurality of processing units. These processing units may be physically located within the same device, or processor 118 may represent processing functionality of a plurality of devices operating in coordination.

As is shown in FIG. 3, processor 118 may be configured to execute one or more computer program modules. The one or more computer program modules may include one or more of a user module 120, a goods creation module 122, a goods distribution module 124, a goods modification module 126, a nested content module 128, a collection module 129, a tracking module 130, an alert module 131, a loyalty module 132, a billing/payment module 134, an analytics module 136, a ratings module 138, and/or other modules. Processor 118 may be configured to execute modules 120, 122, 124, 126, 128, 129, 130, 131, 132, 134, and/or 136 by software; hardware; firmware; some combination of software, hardware, and/or firmware; and/or other mechanisms for configuring processing capabilities on processor 118.

It should be appreciated that although modules 120, 122, 124, 126, 128, 129, 130, 131, 132, 134, and 136 are illustrated in FIG. 3 as being co-located within a single processing unit, in implementations in which processor 118 includes multiple processing units, one or more of modules 120, 122, 124, 126, 128, 129, 130, 131, 132, 134, and/or 136 may be located remotely from the other modules. In implementations in which system servers 104 and virtual environment servers 102 operate in a coordinated manner to provide the functionality described herein with respect to processor 118, some or all of the functionality attributed to one or more of 120, 122, 124, 126, 128, 129, 130, 131, 132, 134, and/or 136 may be provided by the modules executed on processors 112 of virtual environment servers 102. The description of the functionality provided by the different modules 120, 122, 124, 126, 128, 129, 130, 131, 132, 134, and/or 136 described below is for illustrative purposes, and is not intended to be limiting, as any of modules 120, 122, 124, 126, 128, 129, 130, 131, 132, 134, and/or 136 may provide more or less functionality than is described. For example, one or more of modules 120, 122, 124, 126, 128, 129, 130, 131, 132, 134, and/or 136 may be eliminated, and some or all of its functionality may be provided by other ones of modules 120, 122, 124, 126, 128, 129, 130, 131, 132, 134, and/or 136. As another example, processor 118 may be configured to execute one or more additional modules that may perform some or all of the functionality attributed below to one of modules 120, 122, 124, 126, 128, 129, 130, 131, 132, 134, and/or 136.

The user module 120 may be configured to access and/or manage one or more user profiles associated with users of the system 100. The one or more user profiles may include information stored by electronic storage 110, electronic storage 116, one or more of the client computing platforms 108, and/or other storage locations. The user profiles may include, for example, information identifying the player (e.g. a username or handle, a number, an identifier, and/or other identifying information), security login information (e.g., a login code or password, biometric information, voice recognition information, and/or other information), virtual environment specific account Information, subscription information, virtual currency account information (e.g., related to currency held in credit for a user), user loyalty information (e.g., points, badges, status, and/or other information), user payment information (e.g., a payment account, and/or other payment information), and/or other information related to users.

The user module 120 may be configured to access and/or manage one or more user profiles associated with user of the system 100. The one or more user profiles may include information stored by electronic storage 110, electronic storage 116, one or more of the client computing platforms 108, and/or other storage locations. The user profiles may include, for example, friend information (e.g., information related to friends of a user), virtual environment usage information, demographic information associated with users, interaction history among users in one or more virtual environments and/or other environments, information stated by users, purchase information of users, browsing history of users, and/or other information related to users. The goods creation module 122 may be configured to create virtual goods. The virtual goods may include nested content. The virtual goods may be created and instances of the virtual goods may be distributed by system 100 for entities not directly operating and/or administrating system 100. Such entities may include, for example, advertisers, sponsors, content distributors.

Creating virtual goods may comprise setting criteria defining instances of the virtual good. The criteria may include one or more of distribution criteria, stage criteria, expression criteria, nested content criteria, content dispersal criteria, and/or other criteria. The criteria may be set by the operator of system servers 104, a sponsor of a virtual good being created, a creator or supplier of nested content being dispersed through instances of a virtual good being created, an operator of virtual environment servers 102, and/or other entities. In some implementations, some of the criteria (e.g., expression criteria, nested content criteria, and/or other criteria) may be set by users for their own use and/or for distribution of one or more instances as a gift, a virtual product, and/or for other distributions. Such customization by users may enhance engagement with the virtual goods.

In some implementations, goods creation module 122 may be configured to receive selection or entry by a user of distribution criteria, stage criteria, expression criteria, nested content criteria, content dispersal criteria, and/or other criteria such that the user is enabled to create a virtual good. The user may set the distribution criteria of the virtual good to create a gift (or set of gifts) to a friend, co-worker, relative, and/or people. To provide nested content of value (e.g., proprietary audio or video content, virtual currency, coupons, and/or other nested content), the user may be required to pay for the nested content before distribution to a recipient. The goods creation module 122 may be configured to receive payment for the nested content. The payment may be in the form of virtual currency, real world currency, and/or other forms of payment.

The goods creation module 122 may provide a platform to users on which the users can create templates or virtual goods that can be re-used by other individual users creating virtual goods. For example, a first user may create expression criteria that defines a particularly stylish, inventive, or otherwise desirable expression for the virtual good. The first user may make these expression criteria available to other users that are creating their own virtual goods with nested content. The goods creation module 122 may be configured to present to users a set of available templates. The available templates may include, for example, expression criteria defining an expression for a virtual good.

The goods creation module 122 may be configured to receive selection of one of the available templates, and responsive to such selection, incorporate the template into a virtual good being created by the selecting user. In order to select a template, the selecting user may be required to provide some consideration to the user that created the selected template, to the operator of system 100, and/or to some other party. After selecting the template, the selecting user may then select and/or enter other criteria defining the virtual good (e.g., distribution criteria, nested content criteria, and/or other criteria). This functionality may establish a marketplace amongst the users in which the users can create, trade, and/or sell templates for the creation of virtual goods.

In creating a virtual good defined by criteria, goods creation module 122 may be configured to create the electronic files representing the virtual goods. The electronic files may be readable by virtual environment servers 102 and/or client computing platforms 108, and may cause the expressions of the virtual goods to be presented to the users on client computing platforms 108.

The goods distribution module 124 may be configured to distribute instances of the virtual goods created by goods creation module 122. Distribution of the instances of the virtual goods may include transmitting the electronic files corresponding to the virtual goods to the appropriate users. Determination of the appropriate users for a given virtual good may be determined by goods distribution module 124 in accordance with the distribution criteria for the given virtual good. The electronic files corresponding to the virtual goods may include providing the electronic files to the users via virtual environment servers 102, via email, via other electronic message, and/or via other electronic communication mechanism.

In some implementations; virtual goods distributed to the users may be available to the users across multiple virtual environments. This may involve providing expressions of a single instance of a virtual good to a user on multiple virtual environments. For example, a user may receive one expression of a single instance of a virtual good on a social networking web site, another expression of the instance of the virtual good in a virtual space, and/or expression of the instance of the virtual good in a mobile or web application dedicated to the access and distribution of the virtual goods, a web page provided by system 100, and/or other expressions of the instance of the virtual good in other virtual environments. To accomplish this multi-environment distribution, goods distribution module 124 may be configured to transmit electronic files for the virtual good to the separate virtual environment appropriate for the user. In such implementations, actions taken by the user with respect to the instance in one of the multiple virtual environments (e.g., receiving the nested content, re-distributing the virtual good, and/or other actions) may be reflected in the expressions of the instance of the virtual good on some of all of the other virtual environments.

Once the electronic file corresponding to a virtual good is received by a user in the one or more appropriate virtual environments, an instance of the virtual good may be expressed in the virtual environment(s) as being associated with the user. Association of the virtual good with the user may mean the instance of the virtual good appears in a space (e.g., a wall, a pegboard, a house, a room, a collection case, a personal electronic dashboard, a vehicle interior, and/or other space) associated with the user, may mean an instance of the virtual good is included in the inventory for the user in the virtual environment, may mean the instance of the virtual good is wearable, usable, and/or displayable by an avatar under control of the user in the virtual environment, and/or may mean the instance of the virtual good is associated with the user in other ways.

The goods distribution module 124 may be configured to re-distribute instances of virtual goods between the users. Re-distribution of an instance of the virtual goods may enable gifting of an instance of the virtual good, trading of an instance of the virtual good, buying or selling of an instance of the virtual good, and/or other transactions in which an instance of the virtual good passes from one user to another. The transfer of an instance of the virtual good from one user to another in one or more virtual environments may result in both the transferor and the transferee having an instance of the virtual good. The transfer of an instance of the virtual good from one user to another in the virtual environment(s) may result in the transferee receiving the instance of the virtual good and the transferor no longer having the instance of the virtual good. To effect re-distribution of an instance of the virtual good from one user to another, the goods distribution module 124 may be configured to provide the transferee with one or more electronic files (e.g., in one or more virtual environments appropriate to the second user associated with the instance of the virtual good). The electronic file may be transmitted to the transferee in the same manner in which the electronic file was transmitted to users in the initial distribution.

In some implementations, transferring a virtual good from one user to another may require proximity between client computing platforms 108 of the users. In such implementations, the transmission may require an exchange of information (e.g., the electronic file of a virtual good, an electronic token associated with the virtual good, and/or other information) via a range limited electronic protocol. Such protocols may include, for example, Near-Field Communication, Bluetooth communication, Wi-Fi communication, and/or other range limited electronic communications protocols. If the information exchanged between the client computing platforms 108 is a token associated with the virtual good being exchanged, goods distribution module 124 may be configured to detect that the client computing platform 108 of the transferee has received the token, and may transfer the electronic file of the virtual good to the transferee responsive to this detection.

The goods distribution module 124 may be configured such that a user transferring an instance of a virtual good to another user may add a comment or message to the instance of the virtual good. The comment or message may include a personalization, a greeting, a hint or clue as to how the nested content can be accessed, and/or other information. The goods distribution module 124 may be configured to receive the comment or message from the transferor, and may be configured to include the comment or message with or in the instance of the virtual good provided to the transferee.

The goods distribution module 124 may be configured such that users may transfer an instance of a virtual good to a user that has not initiated a user account with user module 120. For example, a first user may wish to distribute an instance of a virtual good to a second user that has not yet set up an account with user module 120. The first user may affect the distribution via goods distribution module 124, indicating a first user identification for the distribution. The user identification may include, for example, an email address, a username on a virtual environment external to server 104, biometric information, voice recognition information, and/or user identifications. At the time when the second user sets up an account on server 104 with user module 120, the second user may be asked to associate external user identifications with the user account. Associating the external user identifications with the user account may require the user authenticate the external user identifications (e.g., respond to a message sent to the external user identification, select a link in a message sent to the external user identification, provide a code included in a link sent to the external user identification, and/or other authentications). Responsive to the second user associating the first user identification with his account, the instance of the virtual good previously distributed from the first user may be awarded to the second user. The goods modification module 126 may be configured to modify instances of virtual goods. Modification of instances of virtual goods may include modifying instances of virtual goods as the instances of the virtual goods pass between stages. As such, goods modification module 126 may be configured to identify events specified in stage criteria, and to transition instances of a virtual good between the appropriate stages responsive to the identified events. As was mentioned above, modification of an instance of the virtual good between stages may include one or more of modifying an expression of the instance of the virtual good, modifying the unit(s) of nested content offered via the instance of the virtual good, modifying the activity by users required to obtain nested content from the instance of the virtual good, and/or other modifications. The modifications may be in accordance with the modifications specified in the various criteria defining the instances of the virtual good (e.g., the expression criteria, the nested content criteria, the content dispersal criteria, and/or other criteria). Modifying the instances of the virtual good may include modifying the electronic file (or files) associated with the instances of the virtual good. Modifying the instances of the virtual good may include replacing the electronic file associated with instances of the virtual good. To modify or replace the electronic file, the goods modification module 126 may communicate with virtual environment servers 102. It will be appreciated from the description of virtual goods herein that changes to the virtual goods may be accomplished based on the electronic files defining virtual goods without or with less action taken by goods modification module 126.

The nested content module 128 may be configured to provide the nested content associated with the instances of the virtual goods. Providing the nested content associated with the virtual goods may comprise one or more of including an electronic file associated with the nested content (e.g., a content file or other files) with the instances of the virtual good at distribution, hosting electronic files associated with the nested content for downloads by the instances of the virtual good, virtual environment servers 102, and/or client computing platforms 108, and/or otherwise providing the nested content to the users. The nested content associated with the virtual goods may be dictated, as discussed herein, by the nested content criteria defining the instances of the virtual goods.

The nested content module 128 may be configured to provide the nested content to the users in accordance with the content dispersal criteria of the units of nested content. As such, nested content module 128 may provide a unit of nested content associated with a given instance of a virtual good to a user responsive to fulfillment of the current content dispersal criteria for the given instance of the virtual good. As such, nested content module 128 may be configured to provide the nested content to the users responsive to users attaining an interactivity threshold, paying a purchase price, and/or satisfying other content dispersal criteria.

The collection module 129 may be configured to provide the users with an enumeration of virtual goods distributed to the user by system 100. This may include presenting a user interface to a user that represents virtual goods received by the user, saved by the user, re-distributed from the user to other users, and/or other virtual goods. The user interface may represent the virtual goods by presenting expressions of the virtual goods. The user interface may be presented to the users within one or more of the virtual environments described herein, such as a social networking web site, a virtual space, a micro-blogging service, a dedicated web or mobile application, a web page provided by system 100, and/or other virtual environments.

The collection module 129 may be configured to receive selection and/or entry from the users as to whether individual virtual goods should be saved, discarded, archived, re-distributed, selected for further interaction (e.g., to attempt or re-attempt to unlock nested content), and/or other interactions. The collection module 129 may be configured such that the user interface presents views of the virtual goods that are organized based on previous selections and/or entries by the user. Such views may include a view of recently received virtual goods, saved virtual goods, discarded or deleted virtual goods, archived virtual goods, virtual goods that have been re-distributed, virtual goods from which one or more units of nested content have been previously obtained, virtual goods from which no nested content has been previously obtained, and/or other views.

The collection module 129 may be configured such that the user interface presents to the user which of the user's friends have or have not previously received individual ones of the virtual goods previous received by the user. The user's friends may include friends of the user in one or more of the virtual environments, as indicated in the user profile of the user. If a friend of the user has received a given virtual good, this may be indicated in the user interface presented to the user even if the friend received the given virtual good from someone other than the user. These indications provided by the user interface may facilitate decisions by the user as to which friends a given virtual good should be re-distributed to.

The collection module 129 may be configured such that the user interface presents to the user which of the user's friends have or have not received nested content from individual ones of the virtual goods. This may include indicating whether the user's friends have obtained nested content from individual ones of the virtual goods the user has redistributed to his friends. These indications may indicate what nested content was received from an individual virtual good by an individual friend.

The tracking module 130 may be configured to monitor one or more of the instances of the virtual goods, user interaction with the instances of the virtual goods, nested content obtained by the users via the instances of the virtual goods, usage of nested content, saving of a virtual good in a collection user interface, discarding or hiding of a virtual good in a collection user interface, and/or other information associated with the virtual goods, the users, and/or the nested content. To monitor these and/or other phenomena, tracking module 130 may be configured to communicate with virtual environment servers 102, external resources 106 (e.g., offerors of incentives delivered through virtual goods and/or other external resources), client computing platforms 108, and/or other entities. Identifiers associated with the virtual goods may be leveraged to track individual expressions, individual instances, individual units of nested content, separate combinations of expression and nested content, and/or other components of virtual goods or individual virtual goods themselves.

In some implementations, information generated or obtained by tracking module 130 may be implemented to update one or more user interfaces presented by collection module 129. For example, if a first user has distributed a virtual good to a second user, tracking module 130 may receive an indication when the second user has obtained nested content from the virtual good, has re-distributed the virtual good, to a third user, and/or performed other interactions with respect to the virtual good. The user interface presented to the first user by collection module 129 may include representations of such interactions to the first user. This may permit the first user to follow the interactions of the second user with respect to the virtual goods the first user has distributed to the second user. Users may find that the ongoing indications of interaction with virtual goods they have redistributed to other users enhances their enjoyment in redistributing the virtual goods.

The alert module 131 may be configured to generate alerts to users. The alerts may notify users of events related to virtual goods provided by system 100. The alerts generated for a given user may include alerts indicating one or more of reception of a new virtual good, reception of nested content from a virtual good, acceptance of a virtual good that the given user has distributed (or re-distributed) to another user, reception of nested content by another user from a virtual good that was distributed (or re-distributed) by the given user, re-distribution by another user of a virtual good that was distributed (or re-distributed) by the given user, and/or other events related to virtual goods provided by system 100. The alerts may include visual alerts, audio alerts, and/or other alerts. The alerts may be provided to the given user in the user interface provided to the given user by collection module 129, on a social networking website, as a text message, as an email, as a chat or instant message, by a micro-blogging service, and/or by other electronic communication mechanisms.

The loyalty module 132 may be configured to recognize loyalty of users. Loyalty of users may include one or more of obtaining nested content, interacting with instances of the virtual goods, re-distributing instances of the virtual goods, re-distributing instances of the virtual goods to other users that interact with the instances of the virtual goods and/or obtain the associated nested content, and/or other activities. The loyalty module 132 may be configured to determine if users have performed such activities via communication with tracking module 130. Loyalty may be recognized through the distribution of loyalty points, digital badges or other virtual goods, virtual currency, enhanced functionality within system 100, and/or other metrics of status. The metric(s) of status used to recognize loyalty by loyalty module 132 may be redeemable or non-redeemable. Redeemable metrics of status may be redeemable for virtual goods, nested content dispersed through the virtual goods provided by system servers 104, real world goods and/or services, enhanced functionality from system 100, and/or redeemable for other purposes. As discussed herein, the metric of status may be implemented in determining which users may receive an initial distribution of a virtual good.

In some implementations, loyalty points, virtual currency, other consideration received by users from loyalty module 132, and/or other consideration may be redeemable to obtain enhancements to one or more functions provided by system 100. By way of example, some or all of the function discussed above with respect to the creation of virtual goods by users (or the creation of templates for virtual goods) for distribution to other users may be unlocked and/or enhanced in exchange for consideration provided by loyalty module 132. This may reward users that are active on system 100 with respect to virtual goods by enabling such users to create their own virtual goods, and/or to enhance the level of customization and/or creativity available to them in the creation of virtual goods.

In some implementations, loyalty points, virtual currency, other consideration received by users from loyalty module 132, and/or other consideration may be redeemable to pay for nested content in a virtual good created by a user. This may reward users that are active on system 100 with respect to virtual goods by providing users with nested content for inclusion in virtual goods that they create themselves.

The billing/payment module 134 may be configured to bill sponsors and/or nested content providers associated with virtual goods. Sponsors and/or nested content providers may be billed based on user activity with respect to the virtual goods. For example, a sponsor and/or a nested content provider may be billed responsive to a user receiving an instance of a virtual good, responsive to a user obtaining nested content associated with an instance of a virtual good, responsive to a user purchasing nested content associated with a virtual good, responsive to a user interacting with a virtual good or nested content in a specified and/or predetermined manner, and/or responsive to other user activities. The billing/payment module 134 may be configured to determine whether users have performed such activities via communication with tracking module 130.

Analytics module 136 may be configured to generate one or more metrics or analytics related to distribution and/or re-distribution of virtual goods, interaction with virtual goods, actions of users with respect to virtual goods in a collection user interface (e.g., saving, discarding, hiding, and/or other actions). Analytics module 136 may generate such metrics based on information obtained by tracking module 130. The analytics and/or metrics generated by 136 may be provided to the operator of system 100, to the provider of one or more virtual goods, to the provider of nested content associated with one or more virtual goods, to a sponsor of one or more virtual goods, to a provider of a virtual environment in which one or more virtual goods may be distributed, and/or to other entities. The analytics and/or metrics may be provided to one or more such entities via a user interface provided by system 100 (e.g., by analytics module 136). The user interface may be presented in a virtual environment, on a website hosted by system 100, in a dedicated mobile or web application hosted by system 100, and/or through other mechanisms. The analytics and/or metrics may be provided to one or more such entities via an electronic message (as text or an attachment), such as a text message, an email, a private message, a chat message, and instant message, and/or other electronic messages. The analytics and/or metrics may be provided to one or more such entities through other mechanisms.

The analytics and/or metrics may represent an amount, rate, or proportion at which an action or interaction was taken with respect to a given set of one or more virtual goods. The action or interaction may include one or more of downloading, receiving, or accepting a virtual good from the set of goods in an initial distribution; successfully obtaining nested content from a virtual good from the set of goods; redeeming nested content (if nested content can be redeemed) received from a virtual good from the set of goods; re-distributing a virtual good from the set of goods; attempting to obtain nested content from a virtual good from the set of goods; and/or other actions or interactions. The set of one or more virtual goods may include an individual virtual good, virtual goods having a common expression (or expression feature), virtual goods having a common unit of nested content. virtual goods having a common action required to obtain nested content, virtual goods that were at some point re-distributed by a given user or set of users, virtual goods distributed over a common platform, virtual goods accessed on a common platform. virtual goods being associated with a common brand or product, virtual goods being associated with a common set of brands or products, virtual goods having some combination of these attributes, and/or other sets of virtual goods.

The metrics and/or analytics may be further segmented to express the amount, rate, or proportion at which an action or interaction was taken with respect to a given set of one or more virtual goods by a specific set of one or more users. The set of users may include users divided according to one or more demographic variables (e.g., age, gender, marital status, education, income-level, geographic location, computer use habits, platforms used, and/or other variables). Segmenting the metrics and/or analytics for specific sets of users may provide incite as to how to design virtual goods to enhance effectiveness for a specific cross-section of users, and/or may be useful in other ways.

The ratings module 138 may be configured to receive ratings from users for individual virtual goods. The ratings may indicate satisfaction with an expression of a virtual good, an action required to obtain nested content, nested content within the virtual good, and/or other features of the virtual goods. The ratings module 138 may be configured to receive ratings from users via the user interface presented by collection module 129, via the user interface associate with one or more of the other virtual environments, via electronic message from the users, and/or by other mechanisms for receiving communication from users. The ratings may be aggregated for a set of one or more virtual goods. The sets of virtual goods for which ratings may be aggregated may be the same as or similar to the sets of virtual goods used to determine metrics or analytics by analytics module 136. The aggregated ratings may be segmented by sets of users from which the ratings were received. The sets of users may be the same as or similar to the sets of users by which the analytics and/or metrics determined by analytics module 136 may be segmented.

Figure 9:
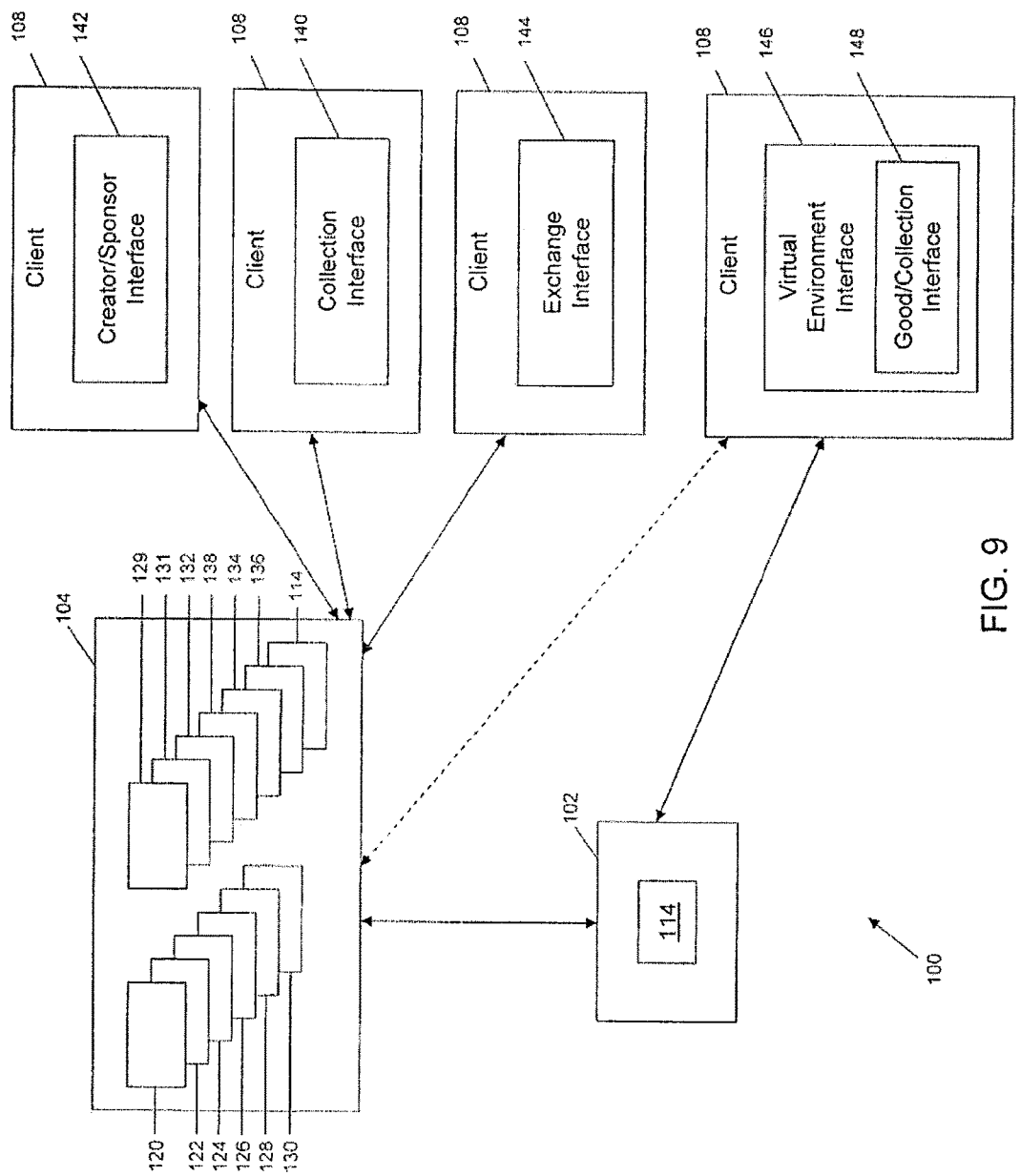
FIG. 9 illustrates a system for creating and distributing a virtual good.

Ratings received through ratings module 138 may be represented in the virtual goods themselves. For example, ratings module 138 may be configured to update the expression of a virtual good to indicate a cumulative or aggregated rating it has received from users. Ratings received through ratings module 138 may be provided to provided to the operator of system 100, to the provider of one or more virtual goods, to the provider of nested content associated with one or more virtual goods, to a sponsor of one or more virtual goods, to a provider of a virtual environment in which one or more virtual goods may be distributed, and/or to other entities. The ratings may be provided to one or more such entities via a user interface provided by system 100 (e.g., by analytics module 136). The user interface may be presented in a virtual environment, on a website hosted by system 100, in a dedicated mobile or web application hosted by system 100, and/or through other mechanisms. The ratings may be provided to one or more such entities via an electronic message (as text or an attachment), such as a text message, an email, a private message, a chat message, and instant message, and/or other electronic messages. The analytics and/or metrics may be provided to one or more such entities through other mechanisms. FIG. 9 illustrates a configuration of system 100 in which virtual good/nested content distribution is provided as a stand-alone (or substantially stand-alone) platform. The platform may include server 104, which may be configured to execute one or more of modules 114, 120, 122, 124, 126, 128, 129, 130, 131, 132, 134, 136, 138, and/or other modules. As such, server 104 may be configured to host a virtual environment to users via client computing devices 108. The virtual environment may be configured to present to users their virtual goods and/or the nested content obtained therefrom.

The virtual environment may be configured to facilitate user interaction with their virtual goods, including the interactions described above with the interface provided by collection module 129. For example, server 104 may be configured to cooperate with a client computing platform 108 to provide a collection interface 140. Collection interface 140 may present to a given user the features and functionality discussed herein with respect to the interface provided by collection module 129. In cooperating with server 104, the client computing platform 108 that presents collection interface 140 to the user may execute a dedicated application configured to communicate specifically with server 104 (e.g., a dedicated mobile application, a widget or gadget on a computer, and/or other dedicated applications). The client computing platform 108 may execute a more general client application, such as a web browser or other general client application, in cooperating with server 104 to present collection interface 140 to the user.

The server 104 may cooperate with a client computing platform 108 to provide a creator/sponsor interface 142 to a user. The user may include a sponsor that has created or intends to sponsor a relatively large number of virtual goods and/or units of nested content, an individual user that has created or intends to create an individual (or relatively small number of) virtual good/nested content pair for distribution to another user (e.g., a friend, a relative, and/or other users). The creator/sponsor interface 142 may be configured to receive exchange information with a creator or sponsor of a virtual good. Such information may include, for example, criteria defining the virtual good and/or nested content, analytics associated with a virtual good and/or nested content, and/or other information. In presenting the creator/sponsor interface 142 to the user, the client computing platform may execute a dedicated application configured to specifically provide creator/sponsor interface 142, or a more general client application.

The server 104 may cooperate with a client computing platform 108 to provide an exchange interface 144 to a user. The exchange interface 144 may be configured to communicate information with the user that enables the user to exchange virtual goods, units of nested content, templates for virtual goods, and/or other items. Such exchanges may include sales, trades, gifts, and/or other exchanges. In presenting the exchange interface 144 to the user, the client computing platform may execute a dedicated application configured to specifically provide exchange interface 144, or a more general client application.

Server 104 may be configured to communicate with server 102 to provide virtual goods with nested content in a virtual environment hosted separately from server 104.

A user may access virtual goods with nested content in such a virtual environment via a virtual environment interface 146 presented on a client computing platform 108 cooperating with server 102 to provide the user with views of the virtual environment. Within the virtual environment interface 146, the virtual goods with nested content may be presented to the user. The user may be able to interact with the virtual goods and/or the nested content by way of a collection interface 148 presented within the virtual environment interface 146. The collection interface 148 may make some or all of the functionality associated with collection interface 140 available inside of virtual environment interface.

Server 104 may communicate with server 102 such that interactions of the user with virtual goods and/or nested content within collection interface 148 are provided to server 104. This may enable users to re-distribute virtual goods with nested content to users across a plurality of virtual environments. For example, a first user may distribute a virtual good with nested content to a second user via selections or entries made into collection module 148. The second user may receive the virtual good with nested content in the virtual environment provided solely by server 104 in collection interface 140, or in a collection interface within some other virtual environment. Communication between server 104 and server 102 may similarly synchronize a user's collection of virtual goods and nested content across a plurality of virtual environments. For example, interactions of a user with a virtual good and/or its nested content (e.g., an attempt to unlock, redistribution to another user, and/or other interactions) via collection interface 140 may be reflected in collection interface 148 for the same user, when the user accesses the virtual goods within virtual environment interface 146.

Figure 4:
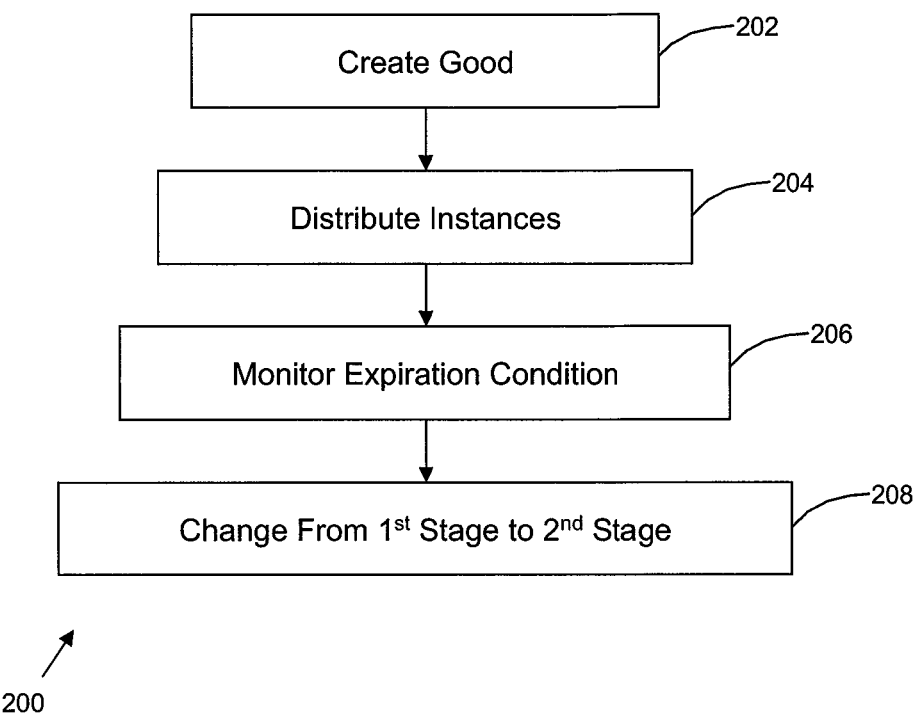
FIG. 4 illustrates a method of distributing virtual goods to users.

FIG. 4 illustrates a method 200 of distributing a virtual good to users, where the virtual good is associated with an offer for a unit of nested content that expires. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 4 and described below is not intended to be limiting. In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a virtual good is created for distribution. Creating a virtual good may include determining criteria defining instances of the virtual good. The criteria may include one or more of distribution criteria, usage criteria, expression criteria, nested content criteria, content dispersal criteria, and/or other criteria. The criteria may be determined automatically, by the provider of the virtual good, by the provider of nested content associated with the virtual good, a sponsor of the virtual good, a provider of a virtual environment in which the virtual good may be distributed, and/or otherwise determined. The criteria may include stage criteria specifying an expiration condition. Satisfaction of the expiration condition may trigger a transition between a first stage of an instance of the virtual good and a second stage of the instance of the virtual good. At least some of the criteria defining the instance of the virtual good may be modified responsive to a transition between the first stage of the virtual good and the second stage of the instance of the virtual good. In some implementations, operation 202 may be performed by a goods creation module similar to or the same as goods creation module 122 (shown in FIG. 3 and described herein).

At an operation 204, instances of the virtual good may be distributed to users of a virtual environment. Distribution of the instances of the virtual good may include transmission of electronic files associated with the virtual good. The virtual good may be distributed to the users in accordance with distribution criteria determined at operation 202 for the virtual good. The distribution criteria may specify the users that should receive the virtual good. In some implementations, operation 204 may be performed by a goods distribution module similar to or the same as goods distribution module 124 (shown in FIG. 3 and described herein).

At an operation 206, the expiration condition may be monitored to determine if the transition from the first stage to the second stage should be triggered for instances of the virtual good. The expiration condition may include one or more of provision of a specified number of units of nested content dispersed (e.g., 1000 downloads for free), distribution and/or re-distribution of a specified number of instances of the virtual good (e.g., first 1000 distributions or re-distributions of the virtual good receive offer of free download), a period of time since instances of the virtual good were originally distributed, a period of time since an individual instance of a virtual good has been received by a user, and/or other conditions. In some implementations, operation 206 may be performed by a goods modification module similar to or the same as goods modification module 126 (shown in FIG. 3 and described herein).

At an operation 208, one or more aspects of the instances of the virtual good may be changed in accordance with the criteria for the second stage. Changing the instances of the virtual good may result in alteration of one or more of nested content available with—an instance of the virtual good, a content dispersal requirement associated with an instance of the virtual good, an expression of an instance of the virtual good, and/or other aspects of an instance of the virtual good defined by the criteria for the virtual good. Changing the instances of the virtual good may impact the virtual good upon re-distribution. For example, the change may not be evident to the first user. However, the change may be effective for a second user that receives an instance of the virtual good from the first user after the change has occurred. Changing the instance of the virtual good may impact the instance of the virtual good before any re-distribution occurs. For example, if the instance of the virtual good was offering a unit of nested content to a first user for a first price (e.g., free), the instance of the virtual good may now offer the unit of nested content to the first user at a second price (e.g., a higher price). Other changes are contemplated. In some implementations, operation 208 may be performed by a goods modification module similar to or the same as goods modification module 126 (shown in FIG. 3 and described herein).

Figure 5:
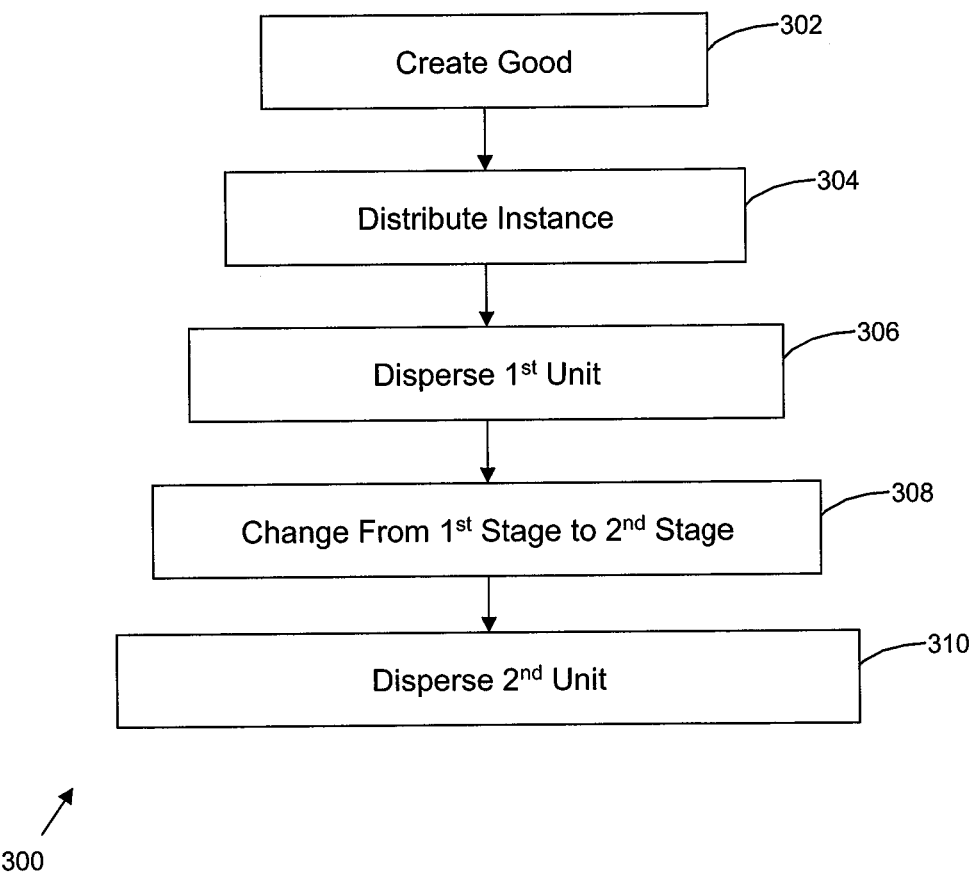
FIG. 5 illustrates a method of distributing a virtual good to a first user, where a first unit of nested content and a second unit of nested content are offered to the first user through the virtual good.

FIG. 5 illustrates a method 300 of distributing a virtual good to a first user, where a first unit of nested content and a second unit of nested content are offered to the first user through the virtual good. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 5 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an opera ion 302, a virtual good is created for distribution. Creating a virtual good may include determining criteria defining instances of the virtual good. The criteria may include one or more of distribution criteria, stage criteria, expression criteria, nested content criteria, content dispersal criteria, and/or other criteria. The criteria may be determined automatically, by the provider of the virtual good, by the provider of nested content associated with the virtual good, a sponsor of the virtual good, a provider of a virtual environment in which the virtual good may be distributed, and/or otherwise determined. The criteria may include stage criteria specifying activity by users. Satisfaction of the stage criteria may trigger a transition between a first stage of instances of the virtual good and a second stage of instances of the virtual good. At least some of the criteria defining the instances of the virtual good may be modified responsive to a transition between the first stage and the second stage. In some implementations, operation 302 may be performed by a goods creation module similar to or the same as goods creation module 122 (shown in FIG. 3 and described herein).

At an operation 304, an instance of the virtual good may be distributed to a first user. Distribution of the instance of the virtual good to the first user may be responsive to the distribution criteria of the virtual good specifying the first user. In some implementations, operation 304 may be performed by a goods distribution module similar to or the same as goods distribution module 124 (shown in FIG. 3 and described herein).

At an operation 306, a first unit of nested content associated with the instance of the virtual good may be dispersed to the first user. The first unit of nested content may be specified by the nested content criteria of the virtual good for the first stage of the virtual good. The first unit of nested content may be dispersed to the first user responsive to the first user satisfying content dispersal criteria specified for the first stage of the instance of the virtual good. For example, the first unit of nested content may be dispersed to the first user responsive to the first user paying a purchase price established by the content dispersal criteria, by the first user (and/or other users) satisfying an activity threshold established by the content dispersal criteria, and/or satisfying other content dispersal criteria. In some implementations, operation 306 may be performed by a nested content module similar to or the same as nested content module 128 (shown in FIG. 3 and described herein).

At an operation 308, responsive to distribution of the first unit of nested content to the first user, the instance of the virtual good may be modified in accordance with the criteria for the second stage. Modification of the instance of the virtual good may result in alteration of one or more of a unit of nested content currently offered via the instance of the virtual good, a content dispersal requirement associated with the instance of the virtual good, an expression of the instance of the virtual good, and/or other aspects of the instance of the virtual good defined by the criteria for the virtual good. More particularly, once the first user has received the first unit of nested content, a second unit of nested content may be offered to the first user through the instance of the virtual good. The second unit of nested content may be determined based on the nested content criteria for the second stage. The second unit of nested content may be specified by the nested content criteria as a function of previous activity by the first user (e.g., previous units of nested content received), preferences set by the first user, ratings of nested content by the first user, demographic information of the first user, and/or other parameters specific to the first user. Modification of the instance of the virtual good may impact the activity required of the first user to receive nested content (e.g., as specified by the content dispersal criteria). For example, if the instance of the virtual good was offering the first unit of nested content to the first user for a first price (e.g., free, based on interaction with the good, and/or for other prices or interaction), the instance of the virtual good may now offer the second unit of nested content to the first user at a second price (e.g., a higher price). Other modifications are contemplated. In some implementations, operation 308 may be performed by a goods modification module similar to or the same as goods modification module 126 (shown in FIG. 3 and described herein).

At an operation 310, the second unit of nested content associated with the virtual good may be dispersed to the first user. The second unit of nested content may be dispersed to the first user responsive to the user satisfying content dispersal criteria specified for the second stage of the instance of the virtual good. In some implementations, operation 310 may be performed by a nested content module similar to or the same as nested content module 128 (shown in FIG. 3 and described herein).

Figure 6:
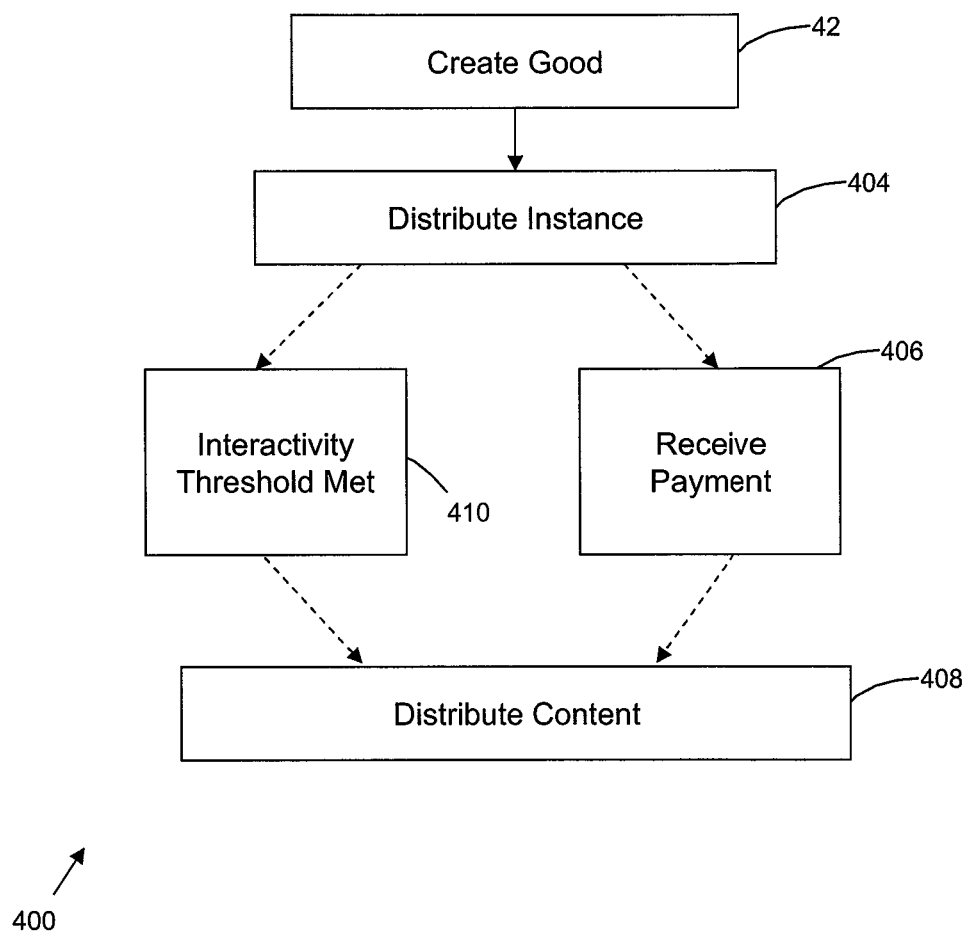
FIG. 6 illustrates a method of distributing a virtual good to a first user, where the first user obtains a unit of nested content associated with the virtual good through either purchase or interaction.

FIG. 6 illustrates a method 400 of distributing a virtual good to a first user, where the first user obtains a unit of nested content associated with the virtual good through either purchase or interaction. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 6 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a virtual good is created for distribution. Creating a virtual good may include determining criteria defining instances of the virtual good. The criteria may include one or more of distribution criteria, stage criteria, expression criteria, nested content criteria, content dispersal criteria, and/or other criteria. The criteria may be determined automatically, by the provider of the virtual good, by the provider of nested content offered through instances of the virtual good, a sponsor of the virtual good, a provider of a virtual environment in which the virtual good may be distributed, and/or otherwise determined. The content dispersal criteria may include one or more of a purchase price of nested content, an interactivity threshold associated with nested content, and/or other content dispersal criteria. In some implementations, operation 402 may be performed by a goods creation module similar to or the same as goods creation module 122 (shown in FIG. 3 and described herein).

At an operation 404, an instance of the virtual good may be distributed to a first user. Distribution of the instance of the virtual good to the first user may be responsive to the distribution criteria of the virtual good specifying the first user. In some implementations, operation 404 may be performed by a goods distribution module similar to or the same as goods distribution module 124 (shown in FIG. 3 and described herein).

Responsive to an attempt by the first user to purchase a first unit of nested content, payment for the first unit of nested content may be received from the first user at an operation 406. Payment by the user may be sufficient to satisfy the purchase price set forth in the content dispersal criteria. The payment may be made in virtual currency, real world currency, and/or through other payment mechanisms. In some implementations, operation 406 may be performed by a nested content module similar to or the same as nested content module 128 (shown in FIG. 2 and described herein).

Responsive to payment being received at operation 406, the first unit of nested content may be provided to the first user at an operation 408. In some implementations, operation 408 may be performed by a nested content module similar to or the same as nested content module 128 (shown in FIG. 2 and described herein).

At an operation 410, interaction of the first user and/or other users with instances of the virtual good may be monitored. Monitoring interaction of other users with instances of the virtual good may include monitoring interaction of users that received an instance of the virtual good from the first user. Interaction to be monitored may include passive and/or active interaction with instances of the virtual good. Passive interaction may include passively experiencing content associated with the virtual good (e.g., watching or listening to an advertisement associated with the virtual good). Active interaction may include entering input. For example, active interaction may include playing a game, answering a question, and/or other entering other input. Monitoring interaction with instances of the virtual good may include determining whether interaction by the first user and/or the other users meets an interactivity threshold. The interactivity threshold for active interaction may require watching and/or listening to advertisement(s) associated with the virtual good. The interactivity threshold for active interaction may require an outcome of the interaction. For example, the interactivity threshold may require successfully playing a game (e.g., winning the game or obtaining some objective within the game), correctly answering a question or questions, and/or requiring other outcomes. The interactivity threshold may require re-distribution of instances of the virtual good by the first users and/or the other users.

By setting an interactivity threshold for the first user that requires interaction from users that receive instances of the virtual good from the first user, the virality of the virtual good and/or nested content associated therewith may be enhanced. Such an interactivity threshold may incentivize the first user distributing instances of the virtual good to other users that wilt interact with the distributed instances. Further, the interactivity threshold may be applied to the other users. This may encourage these users to continue to distribute additional instances of the virtual good to still other users that will interact with the distributed instances of the virtual good. This incentivized virality may enhance the number of users that interact in a meaningful way with content provided by a sponsor of the virtual good, for example.

Responsive to the interactivity threshold for the first user being met, method 400 may proceed to operation 408.

Figure 7:
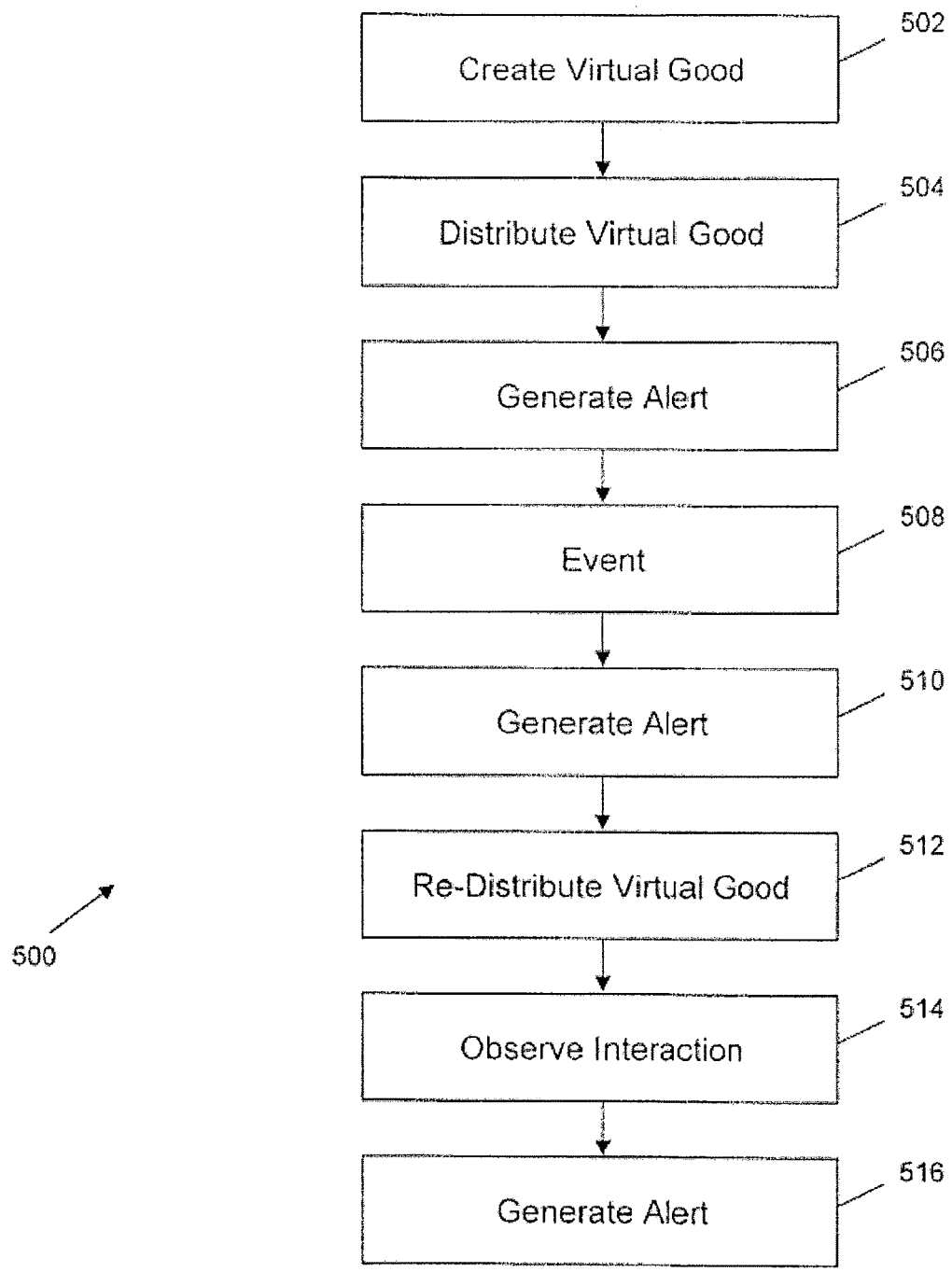
FIG. 7 illustrates a method of distributing a virtual good to a user.

FIG. 7 illustrates a method 500 of distributing a virtual good. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 7 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a virtual good is created for distribution. Creating a virtual good may include determining criteria defining instances of the virtual good. The criteria may include one or more of distribution criteria, stage criteria, expression criteria, nested content criteria, content dispersal criteria, and/or other criteria. The criteria may be determined automatically, by the provider of the virtual good, by the provider of nested content offered through instances of the virtual good, a sponsor of the virtual good, a provider of a virtual environment in which the virtual good may be distributed, and/or otherwise determined. The content dispersal criteria may include one or more of a purchase piece of nested content, an interactivity threshold associated with nested content, and/or other content dispersal criteria. In some implementations, operation 502 may be performed by a goods creation module similar to or the same as goods creation module 122 (shown in FIG. 3 and described herein).

At an operation 504, an instance of the virtual good may be distributed to a first user. Distribution of the instance of the virtual good to the first user may be responsive to the distribution criteria of the virtual good specifying the first user. In some implementations, operation 504 may be performed by a goods distribution module similar to or the same as goods distribution module 124 (shown in FIG. 3 and described herein).

At an operation 506, responsive to distribution at operation 504, an alert may be generated for the first user. The alert may inform the first user of the distribution of the virtual good. In some implementations, operation 506 may be performed by an alert module the same as or similar to alert module 131 (shown in FIG. 3 and described herein).

At an operation 508, an event with respect to the virtual good may take place. The event may include one or more of an expiration of the virtual good, a change in the expression of the virtual good, a change in the nested content associated with the virtual good, an expiration of a time period associated with the virtual good, and/or other events.

At an operation 510, responsive to the event at operation 508, an alert may be generated for the first user. The alert may inform the first user of the event. In some implementations, operation 510 may be performed by an alert module the same as or similar to alert module 131 (shown in FIG. 3 and described herein).

At an operation 512, the virtual good may be re-distributed from the first user to a second user. Re-distribution may be performed responsive to reception of a re-distribution request or command from the first user. In some implementations, re-distribution of the virtual good to the second user may be performed by a distribution module the same as or similar to distribution module 124 (shown in FIG. 3 and described herein).

At an operation 514, interaction by the second user with the virtual good may be observed. The interaction of the second user may include one or more of attempting to obtain nested content from the virtual good, obtaining nested content from the virtual good, re-distributing the virtual good to a third user, redeeming nested content obtained from the virtual good, and/or other interactions. At an operation 516, responsive to the interaction at operation 514, an alert may be generated for the first user. The alert may inform the first user of the interaction with the virtual good by the second user. In some implementations, operation 516 may be performed by an alert module the same as or similar to alert module 131 (shown in FIG. 3 and described herein).

Figure 8:
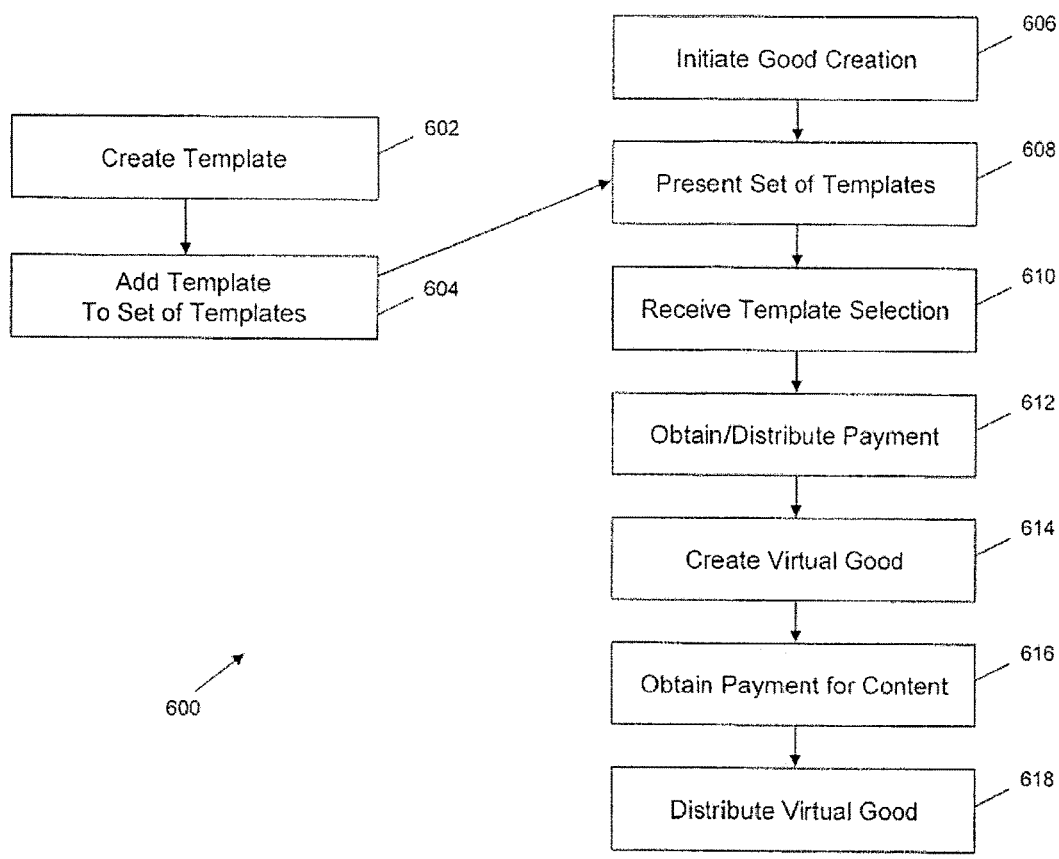
FIG. 8 illustrates a method of creating and distributing a virtual good.

FIG. 8 illustrates a method 600 of creating and distributing a virtual good. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 8 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a template for virtual goods may be created. Creating the template may include predefining some of the criteria defining instances of virtual good. The criteria may include one or more of stage criteria, expression criteria, content dispersal criteria, and/or other criteria. The criteria may be predefined based on input entered or selected by a first user via a virtual goods creation user interface. The virtual goods creation user interface may be provided to the first user by a goods creation module the same as or similar to goods creation module 122 (e.g., shown in FIG. 3 and described herein).

At an operation 604, the template created in operation 602 may be added to a set of templates available to users creating virtual goods. Operation 604 may be performed responsive to entry or selection of input from the first user indicating that the template should be offered to other users creating virtual goods. The input from the first user may set a price for user of the template. The price may be in real world currency, virtual currency, virtual objects, and/or other consideration. In some implementations, operation 604 may be performed by a goods creation module the same as or similar to goods creation module 122 (e.g., shown in FIG. 3 and described herein).

At an operation 606, creation of a virtual good may be initiated. Creation of the virtual good may be initiated responsive to input received from a second user. Operation 606 may by a goods creation module the same as or similar to goods creation module 122 (e.g., shown in FIG. 3 and described herein).

At an operation 608, a set of templates available to facilitate creation of the virtual good may be presented to the second user. The set of templates may include the template created in operation 602. In some implementations, operation 608 may be performed by a goods creation module the same as or similar to goods creation module 122 (e.g., shown in FIG. 3 and described herein).

At an operation 610, selection of the template created in operation 602, from the set of templates presented at operation 608, may be received from the second user. Selection of the template may indicate that the second user intends to incorporate some or all of the criteria predefined by the template into the virtual good being created. In some implementations, operation 610 may be performed by a goods creation module the same as or similar to goods creation module 122 (e.g., shown in FIG. 3 and described herein).

At an operation 612, responsive to the selection at operation 610, the price of the template may be obtained from the second user and distributed to the first user. In some implementations, operation 612 may be performed by a goods creation module the same as or similar to goods creation module 122 (e.g., shown in FIG. 3 and described herein).

At an operation 614, the virtual good may be created. Creating the virtual good may include determining the criteria defining the virtual good. This may include determining some or all of the criteria not defined by the template. The criteria may be determined based on input received from the second user. The criteria determined at operation 614 may include, for example, nested content criteria specifying the nested content available through the virtual good, distribution criteria specifying a third user to which the virtual good should be distributed, and/or other criteria. In some implementations, operation 614 may be performed by a goods creation module the same as or similar to goods creation module 122 (e.g., shown in FIG. 3 and described herein).

At an operation 616, nested content defined by the nested content criteria determined at operation 614 may be paid for by the second user. The nested content may be paid for with real world currency, virtual currency, and/or other consideration. In some implementations, operation 616 may be performed by a goods creation module the same as or similar to goods creation module 122 (e.g., shown in FIG. 3 and described herein).

At an operation 618, the virtual good may be distributed to the third user, in accordance with the distribution criteria. In some implementations, operation 618 may be performed by a goods distribution module the same as or similar to goods distribution module 124 (e.g., shown in FIG. 3 and described herein).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system comprising:
   physical, non-transient, electronic storage media storing a set of templates, each template in the set of templates comprising a set of information for defining an expression of a virtual good in one or more virtual environments;
   physical, non-transient, electronic storage media storing a set of underlying files; and
   one or more processors configured to:
   provide the set of templates to an electronic display of a client computing platform;
   receive from the client computing platform a completed template representing a defined virtual good to be expressed in the one or more virtual environments;
   store a definition of the defined virtual good as an underlying file in the set of underlying files based on the completed template, the definition of the defined virtual good comprising a definition of an expression of the virtual good and a definition of nested content associated with the virtual good;
   access the definition of the expression of the virtual good stored in the underlying file, the definition defining the presentation of the expression on electronic displays of client computing platforms of users receiving views of the one or more virtual environments to represent an instance of the virtual good in the one or more virtual environments;
   access a definition of nested content stored in the underlying file, the nested content being offered only in association with the instance of the virtual good in the one or more virtual environments;

access dispersal criteria stored in the underlying file, wherein the dispersal criteria defines required interaction with the instance of the virtual good in the one or more virtual environments that will result in the nested content associated with the instance of the virtual good being dispersed;

monitor interaction with the instance of the virtual good in the one or more virtual environments to determine whether interaction with the instance of the virtual good has satisfied the dispersal criteria; and responsive to a determination that interaction with the instance of the virtual good has satisfied the dispersal criteria, effectuating dispersal of the nested content, wherein one or more of the expression, the nested content, or the dispersal criteria is identified by a unique identifier.

2. The system of claim 1, wherein the dispersal criteria defines interaction with the instance of the virtual good in the one or more virtual environments required by a first user to disperse the nested content to a second user.

3. The system of claim 1, wherein the dispersal criteria defines interaction with the instance of the virtual good in the one or more virtual environments required by a first user to disperse the nested content to the first user and a second nested content to a second user.

4. The system of claim 1, wherein the dispersal criteria defines interaction with the instance of the virtual good in the one or more virtual environments required by a first user to disperse the nested content to a first user and a second user.

5. The system of claim 1, wherein the one or more processors are further configured to:

distribute the nested content associated with the instance of the virtual good in the one or more virtual environments to a first user based on the satisfaction of the dispersal criteria;

transfer the instance of the instance of the virtual good in the one or more virtual environments from the first user to a second user;

access a second dispersal criteria stored in the underlying file, wherein the second dispersal criteria defines required interaction by the second user with the instance of the virtual good in the one or more virtual environments that will result in a second nested content associated with the instance of the virtual good being dispersed;

monitor interaction with the instance of the virtual good in the one or more virtual environments by the second user to determine whether interaction with the instance of the virtual good has satisfied the second dispersal criteria; and responsive to a determination that interaction by the second user with the instance of the virtual good has satisfied the second dispersal criteria, effectuating dispersal of the second nested content.

6. The system of claim 1, wherein one or more templates in the set of templates predefines a set of criteria for defining an instance of the virtual good in the one or more virtual environments.

7. The system of claim 1, wherein one or more templates in the set of templates predefines a set of criteria for defining an instance of the nested content good associated with the virtual good.

8. The system of claim 1, wherein one or more templates in the set of templates predefines a subset of the dispersal criteria.

9. The system of claim 1, wherein the one or more processors are further configured to:

provide a set of template creation tools to one of the electronic displays of client computing platforms of users;

receive a set of user selected options defining a custom template from the one of the client computer platforms;

store the custom template in the physical, non-transient, electronic storage media as a stored custom template in the set of templates; and provide the set of templates including the stored custom template to an electronic display of a client computing platform.

10. A computer-implemented method comprising:

storing a set of templates and a set of underlying files on physical, non-transient, electronic storage media, each template in the set of templates comprising a set of information for defining an expression of a virtual good in one or more virtual environments;

providing, by a computer comprising a processor and a memory, the set of templates to an electronic display of a client computing platform;

receiving, by the computer, from the client computing platform a completed template representing a defined virtual good to be expressed in the one or more virtual environments;

storing, by the computer, a definition of the defined virtual good as an underlying file in the set of underlying files based on the completed template, the definition of the defined virtual good comprising a definition of an expression of the virtual good and a definition of nested content associated with the virtual good;

accessing, by the computer, the definition of the expression of the virtual good stored in the underlying file, the definition defining the presentation of the expression on electronic displays of client computing platforms of users receiving views of the one or more virtual environments to represent an instance of the virtual good in the one or more virtual environments;

accessing, by the computer, a definition of nested content stored in the underlying file, the nested content being offered only in association with the instance of the virtual good in the one or more virtual environments;

accessing, by the computer, dispersal criteria stored in the underlying file, wherein the dispersal criteria defines required interaction with the instance of the virtual good in the one or more virtual environments that will result in the nested content associated with the instance of the virtual good being dispersed;

monitoring, by the computer, interaction with the instance of the virtual good in the one or more virtual environments to determine whether interaction with the instance of the virtual good has satisfied the dispersal criteria; and responsive to a determination that interaction with the instance of the virtual good has satisfied the dispersal criteria, effectuating dispersal, by the computer, of the nested content, wherein one or more of the expression, the nested content, or the dispersal criteria is identified by a unique identifier.

11. The method of claim 10, wherein the dispersal criteria defines interaction with the instance of the virtual good in the one or more virtual environments required by a first user to disperse the nested content to a second user.

12. The method of claim 10, wherein the dispersal criteria defines interaction with the instance of the virtual good in the one or more virtual environments required by a first user to disperse the nested content to the first user and a second nested content to a second user.

13. The method of claim 10, wherein the dispersal criteria defines interaction with the instance of the virtual good in the one or more virtual environments required by a first user to disperse the nested content to a first user and a second user.

14. The method of claim 10, wherein the method further comprises:
- distributing, by the computer, the nested content associated with the instance of the virtual good in the one or more virtual environments to a first user based on the satisfaction of the dispersal criteria;
- transferring, by the computer, the instance of the instance of the virtual good in the one or more virtual environments from the first user to a second user;
- accessing, by the computer, a second dispersal criteria stored in the underlying file, wherein the second dispersal criteria defines required interaction by the second user with the instance of the virtual good in the one or more virtual environments that will result in a second nested content associated with the instance of the virtual good being dispersed;
- monitoring, by the computer, interaction with the instance of the virtual good in the one or more virtual environments by the second user to determine whether interaction with the instance of the virtual good has satisfied the second dispersal criteria; and
- responsive to a determination that interaction by the second user with the instance of the virtual good has satisfied the second dispersal criteria, effectuating dispersal, by the computer, of the second nested content.

15. The method of claim 10, wherein one or more templates in the set of templates predefines a set of criteria for defining an instance of the virtual good in the one or more virtual environments.

16. The method of claim 10, wherein one or more templates in the set of templates predefines a set of criteria for defining an instance of the nested content good associated with the virtual good.

17. The method of claim 10, wherein one or more templates in the set of templates predefines a subset of the dispersal criteria.

18. The method of claim 10, wherein the method further comprises:
- providing, by the computer, a set of template creation tools to one of the electronic displays of client computing platforms of users;
- receiving, by the computer, a set of user selected options defining a custom template from the one of the client computer platforms;
- storing, by the computer, the custom template in the physical, non-transient, electronic storage media as a stored custom template in the set of templates; and
- providing, by the computer, the set of templates including the stored custom template to an electronic display of a client computing platform.

\* \* \* \* \*